United States Patent [19]
Terasawa et al.

[11] Patent Number: 5,790,316
[45] Date of Patent: Aug. 4, 1998

[54] ZOOM LENS

[75] Inventors: Chiaki Terasawa; Jun Hosoya; Yasuhiro Izumi; Yasuyuki Tomita, all of Kanagawa-ken, Japan

[73] Assignee: Canon Kabushiki Kaisha, Tokyo, Japan

[21] Appl. No.: 425,615

[22] Filed: Apr. 20, 1995

[30] Foreign Application Priority Data

Apr. 26, 1994 [JP] Japan .................... 6-088490
Sep. 13, 1994 [JP] Japan .................... 6-218724

[51] Int. Cl.$^6$ .................................... G02B 15/14
[52] U.S. Cl. .............................. 359/687; 359/740
[58] Field of Search ........................ 359/687, 683, 359/740

[56] References Cited

U.S. PATENT DOCUMENTS 3,918,798  11/1975  Takano ....................... 359/687
4,705,363  11/1987  Ikemori ....................... 359/687
5,097,360  3/1992   Fukami et al. ................ 359/674
5,136,431  8/1992   Terasawa et al. ............. 359/684

FOREIGN PATENT DOCUMENTS 51-21794  7/1976  Japan .
56-52291  12/1981 Japan .

*Primary Examiner*—Scott J. Sugarman
*Attorney, Agent, or Firm*—Fitzpatrick, Cella, Harper & Scinto

[57] ABSTRACT

A zoom lens is disclosed comprising, from front to rear, a first lens unit of positive refractive power, a second lens unit of negative refractive power, a flare cut stop for cutting a lower marginal ray of an off-axial bundle of rays for a maximum image height, a third lens unit of positive refractive power and a fourth lens unit of positive refractive power, wherein the second and third lens units move axially to effect zooming, while either varying the aperture diameter of the flare cut stop or axially moving the flare cut stop to thereby cut the harmful rays for good optical performance.

11 Claims, 24 Drawing Sheets

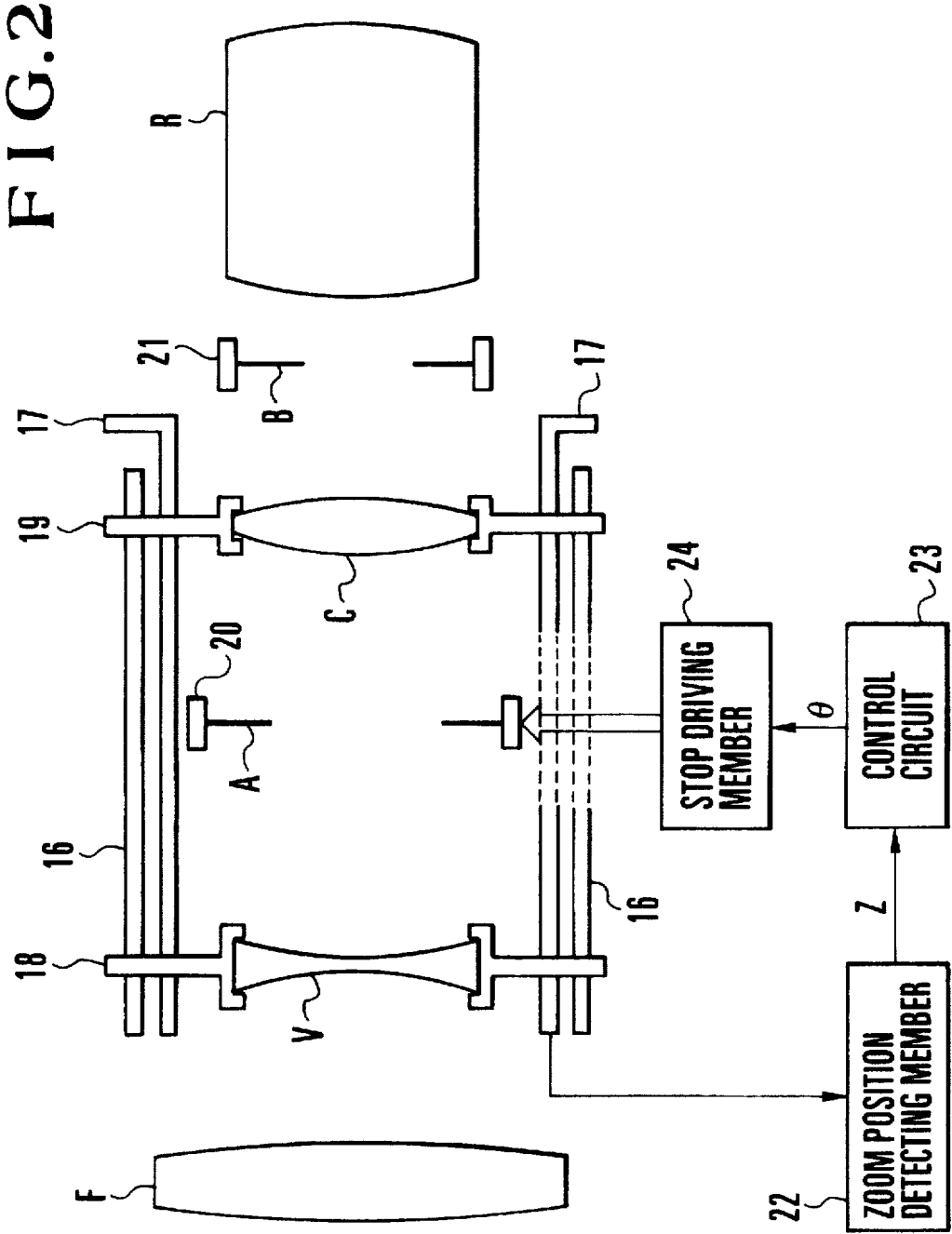

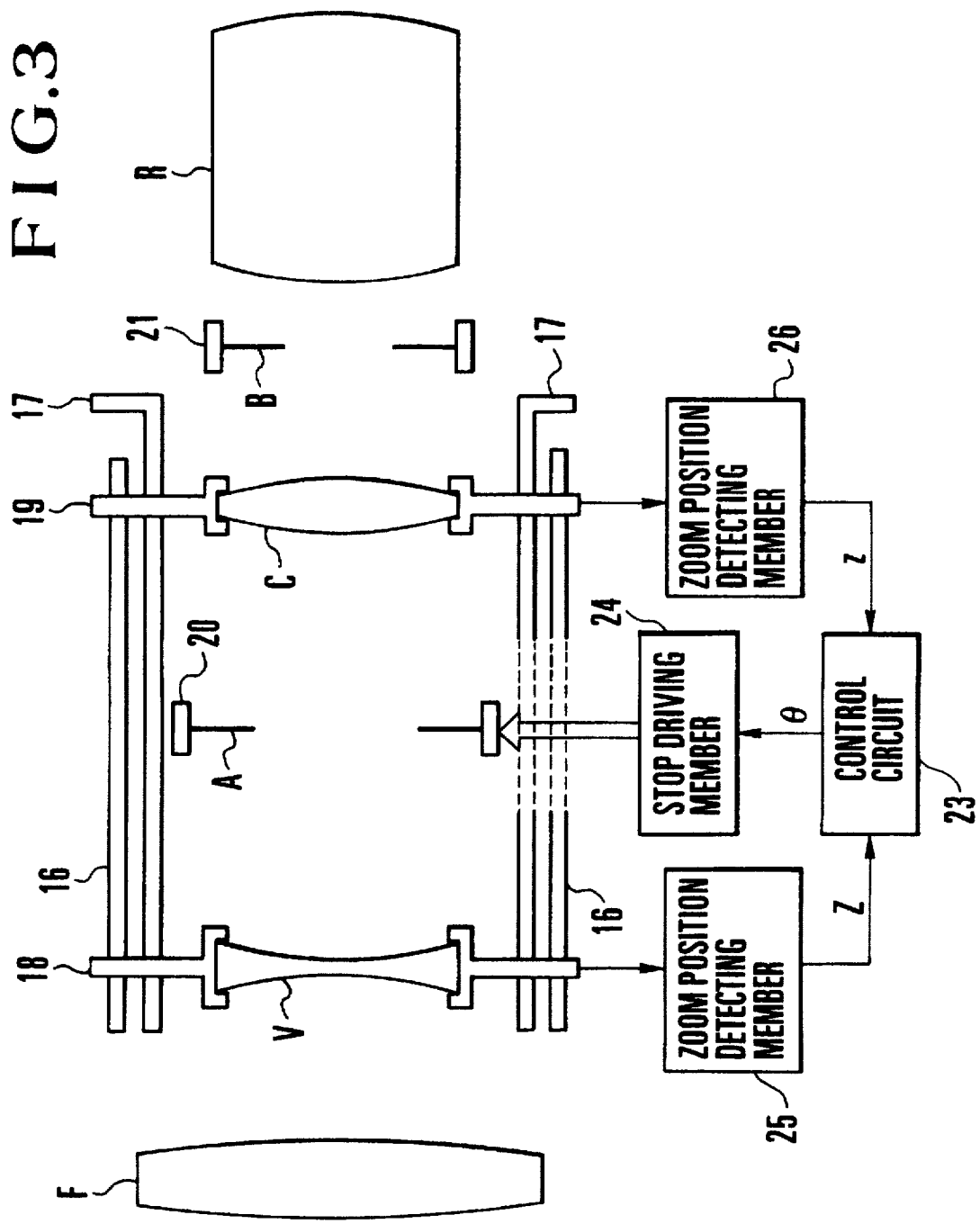

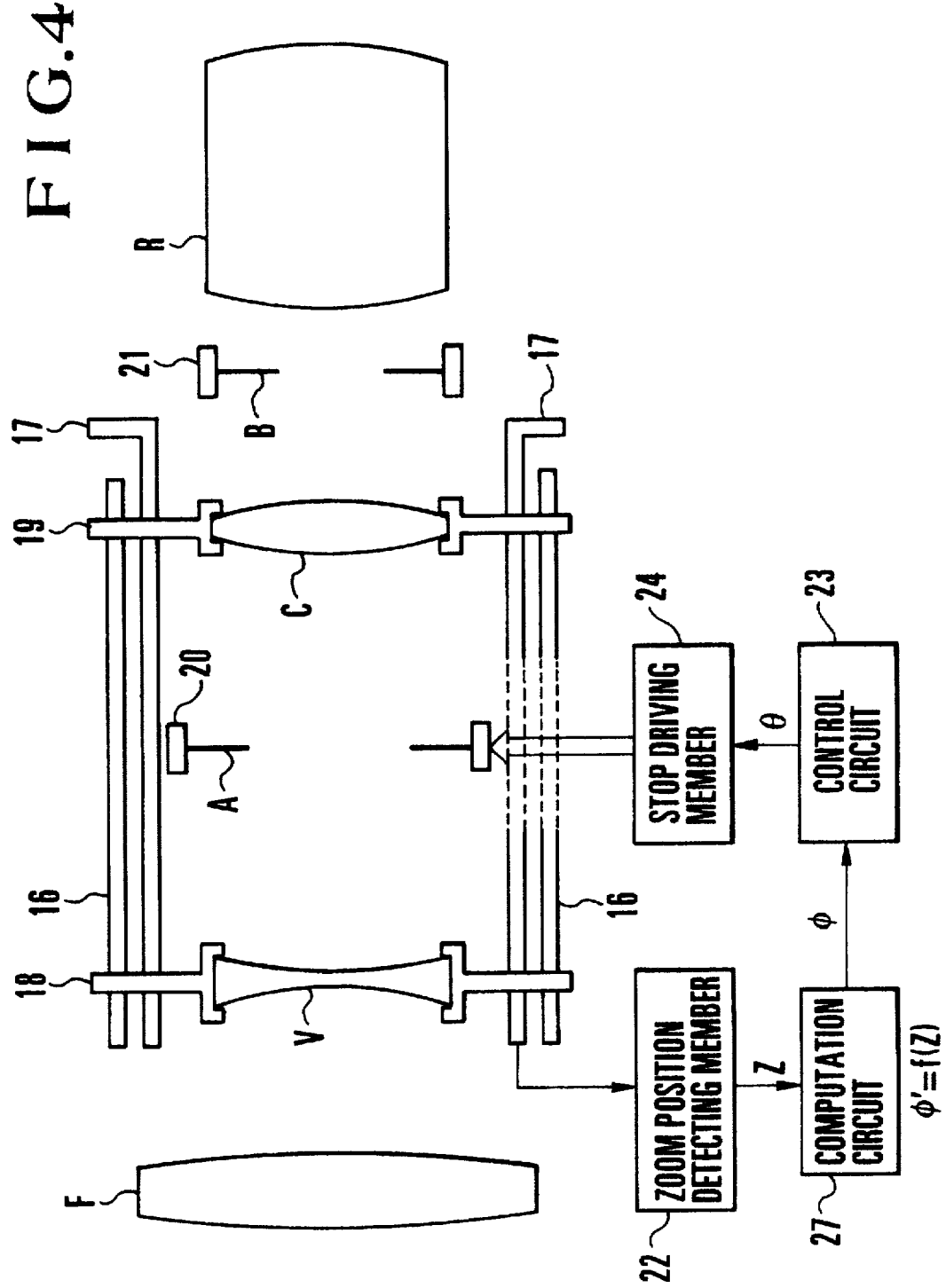

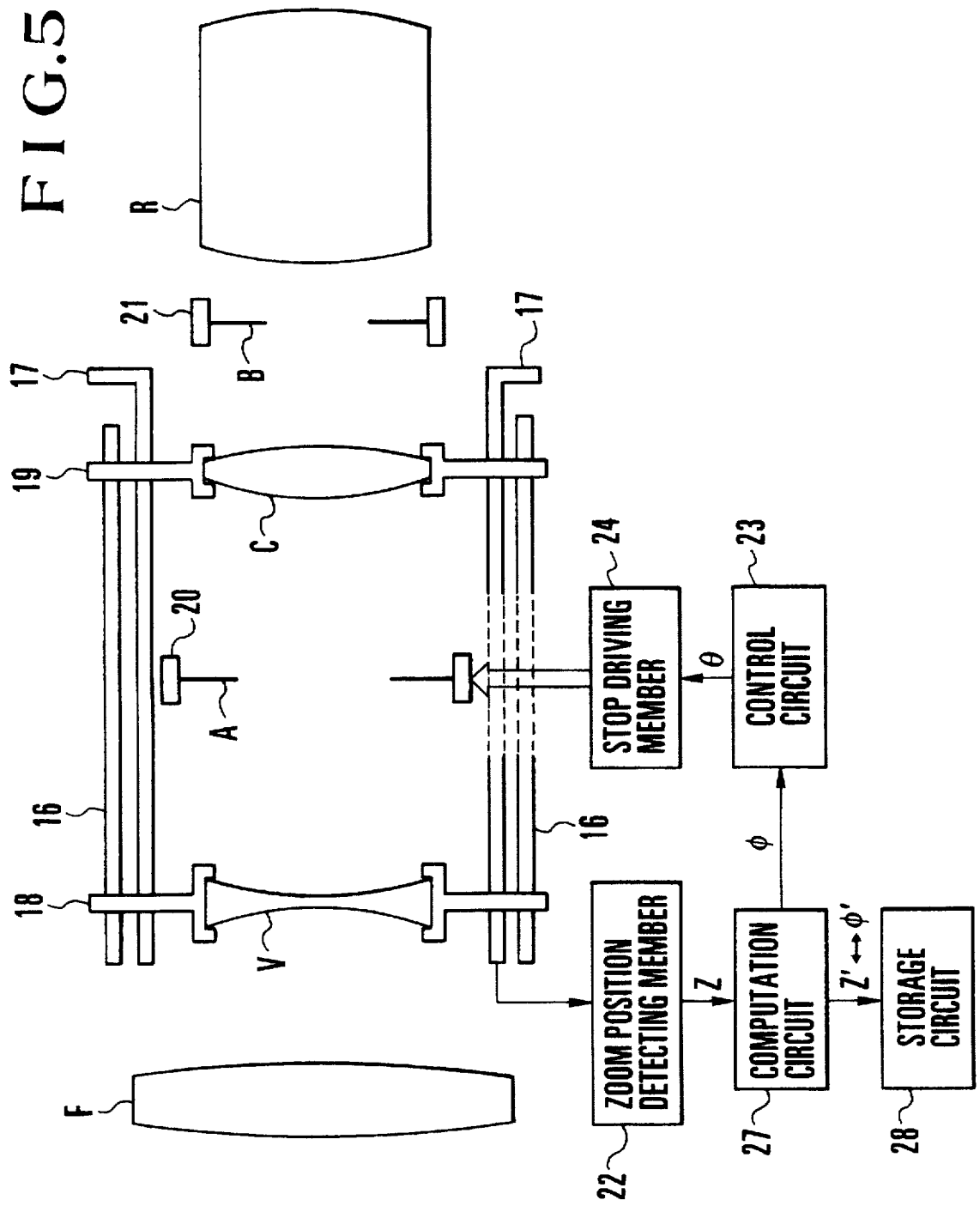

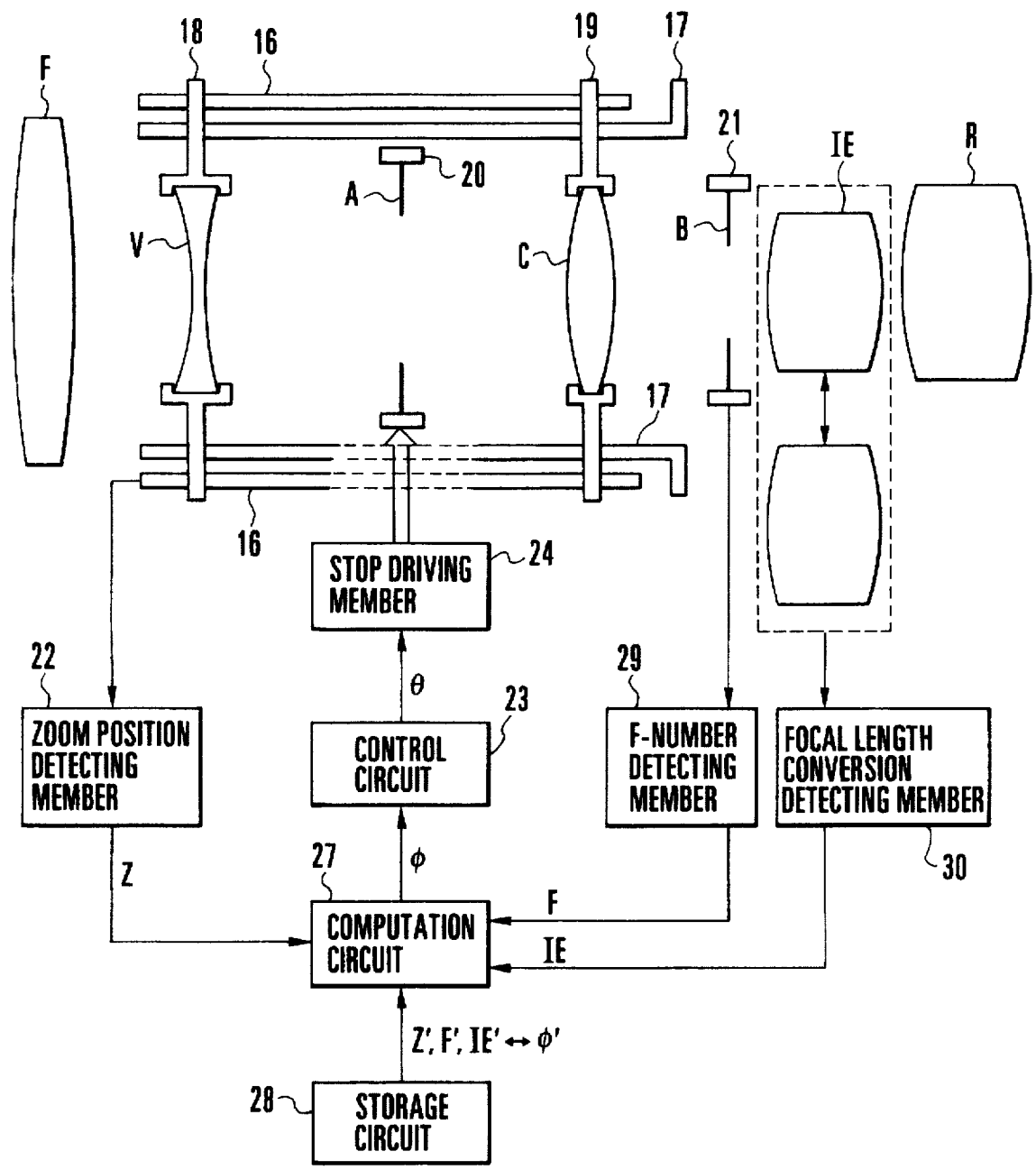

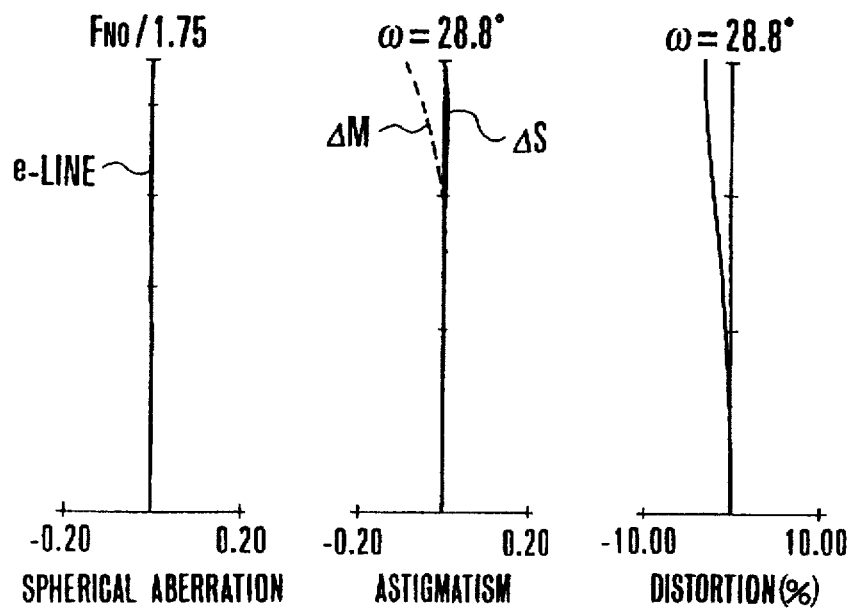
FIG.7(A)(1)  FIG.7(A)(2)  FIG.7(A)(3)
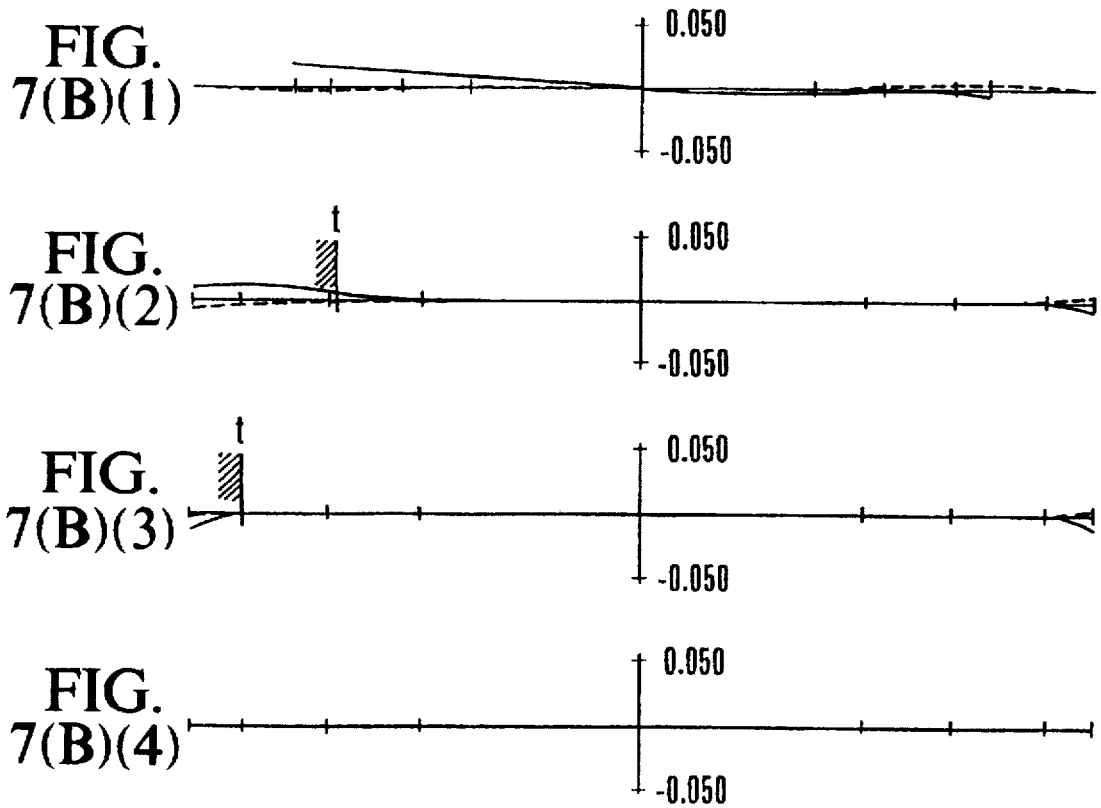
FIG. 7(B)(1)
FIG. 7(B)(2)
FIG. 7(B)(3)
FIG. 7(B)(4)

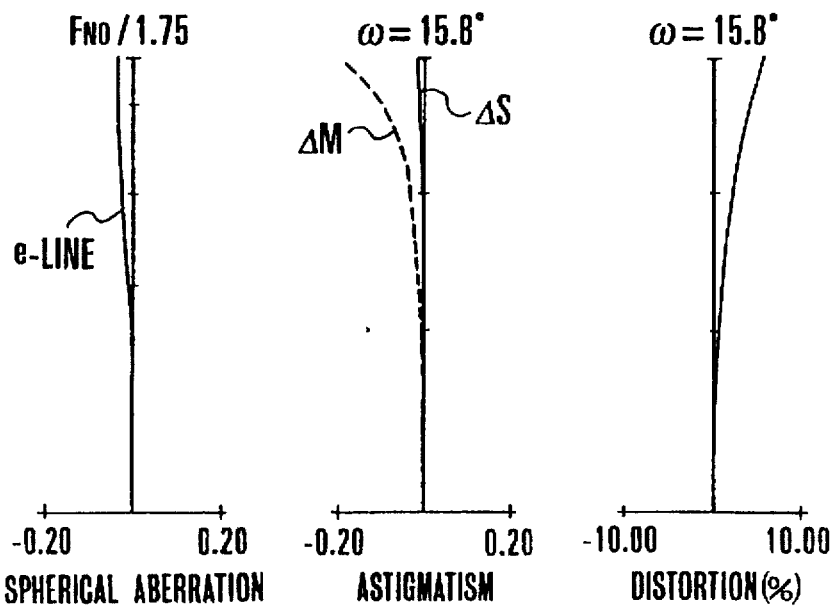
FIG.8(A)(1) FIG.8(A)(2) FIG.8(A)(3)
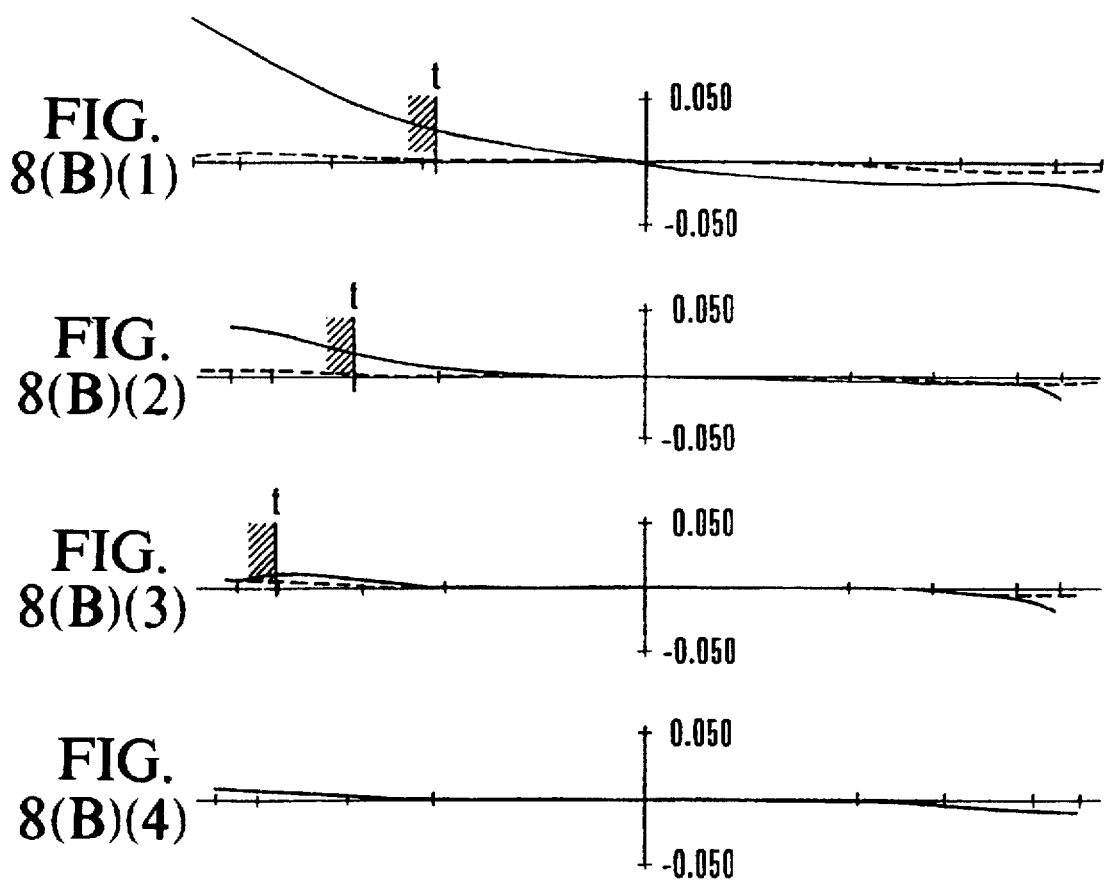

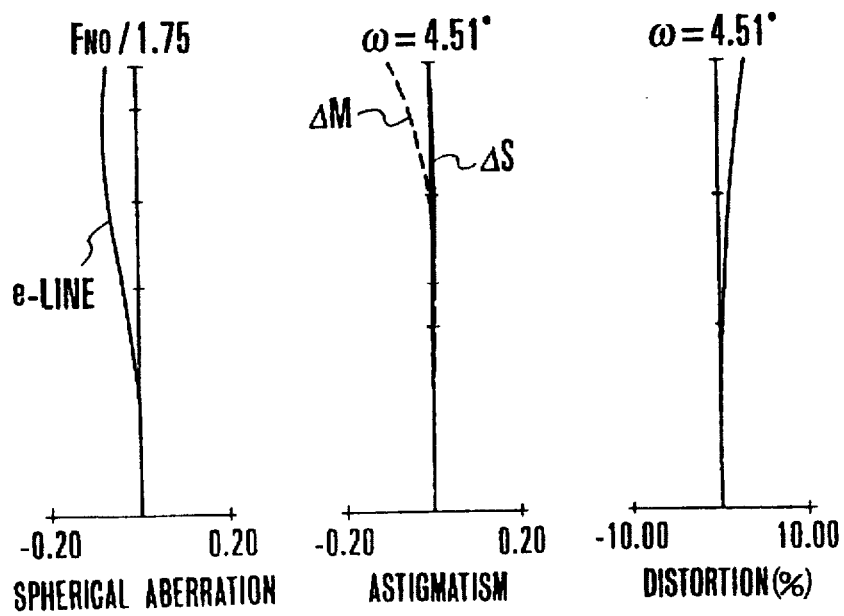
FIG.9(A)(1)   FIG.9(A)(2)   FIG.9(A)(3)
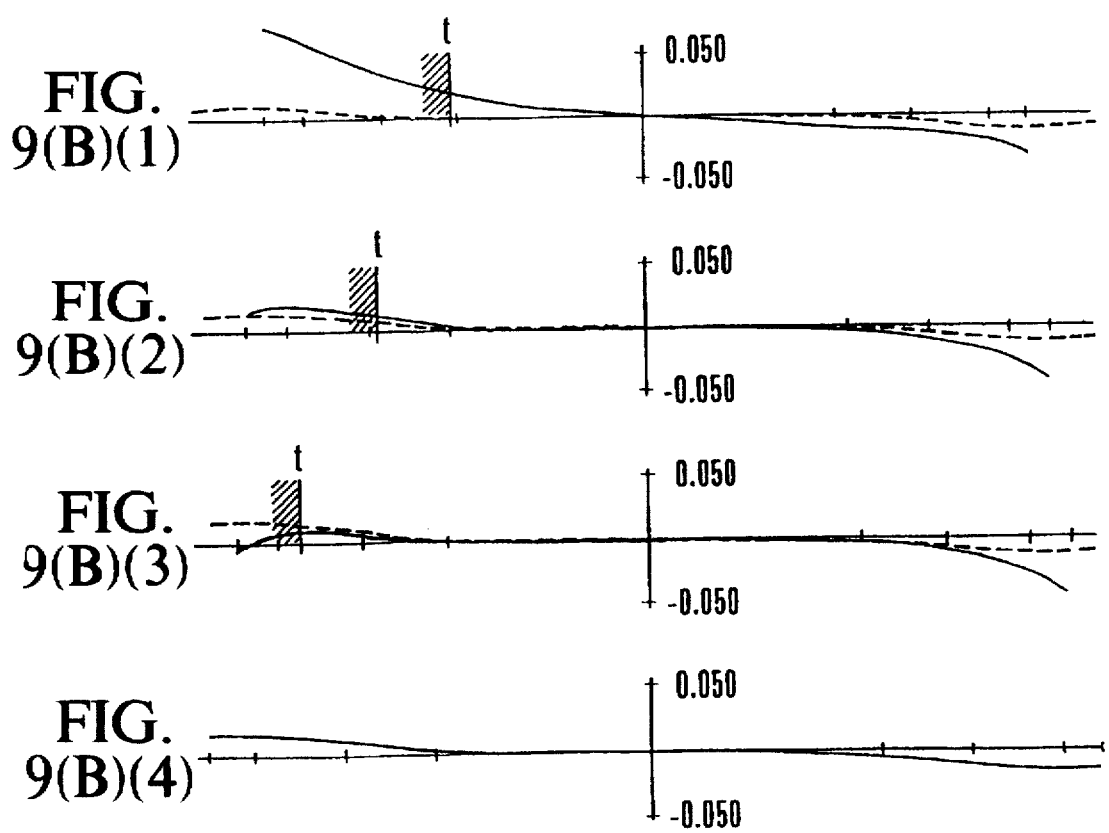

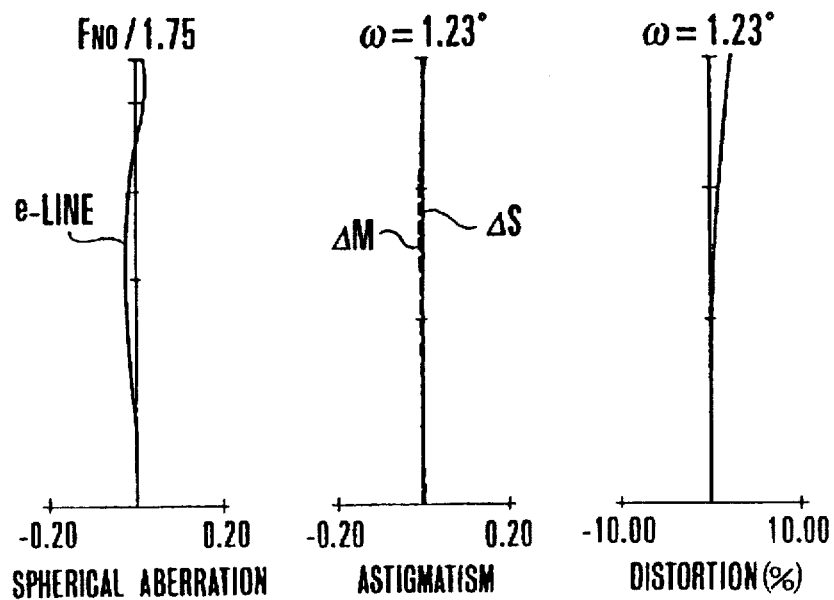
FIG.10(A)(1) FIG.10(A)(2) FIG.10(A)(3)
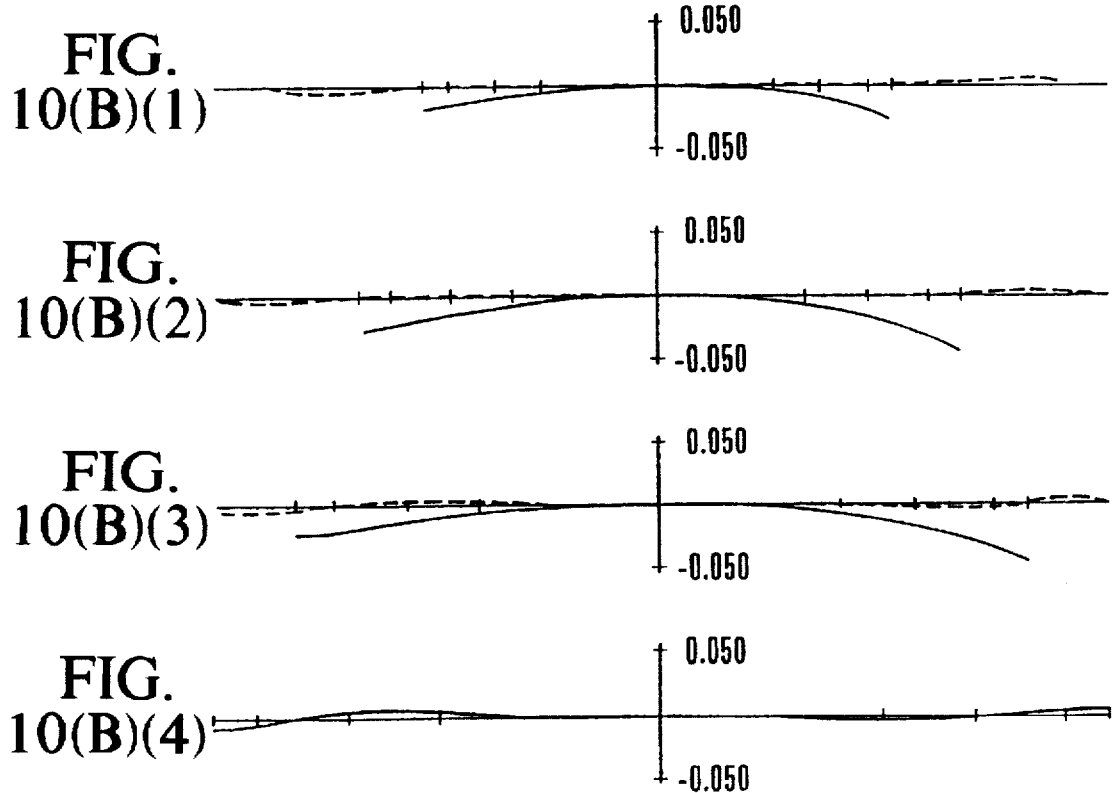

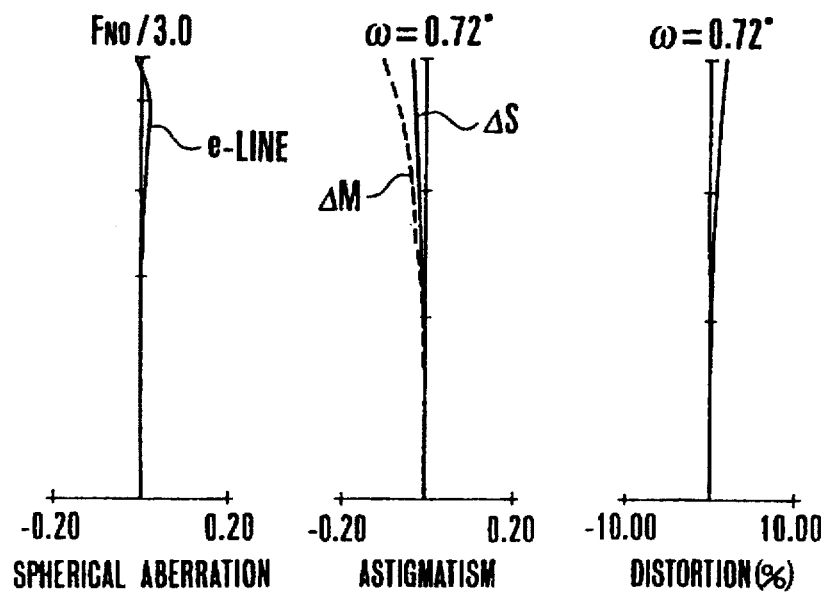
FIG.11(A)(1) FIG.11(A)(2) FIG.11(A)(3)
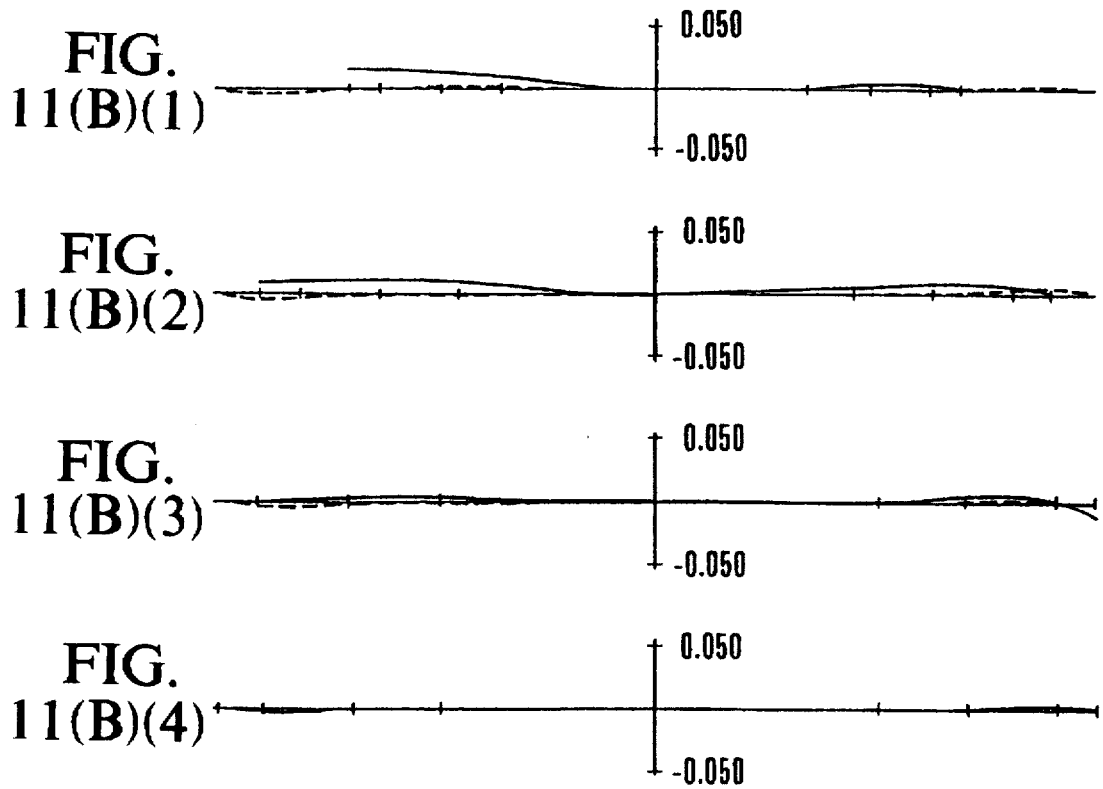

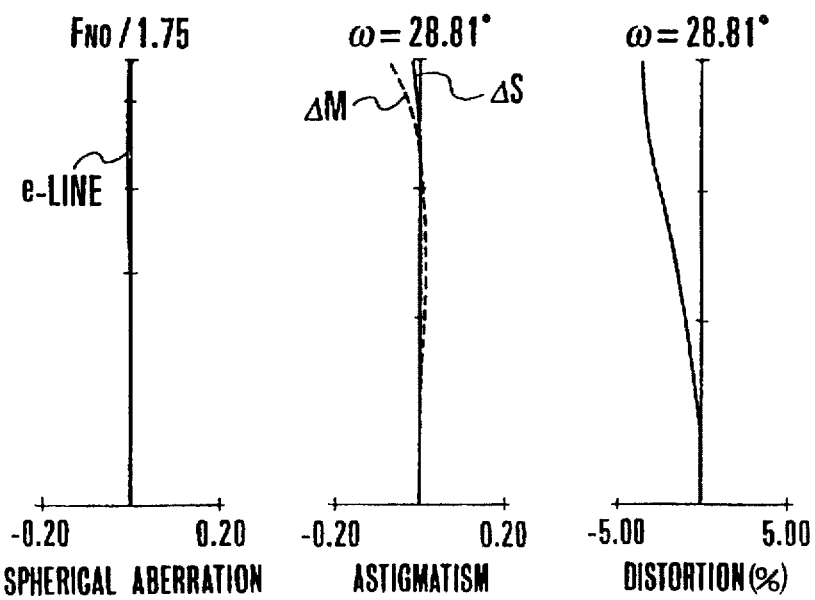
FIG.16(A)(1)  FIG.16(A)(2)  FIG.16(A)(3)
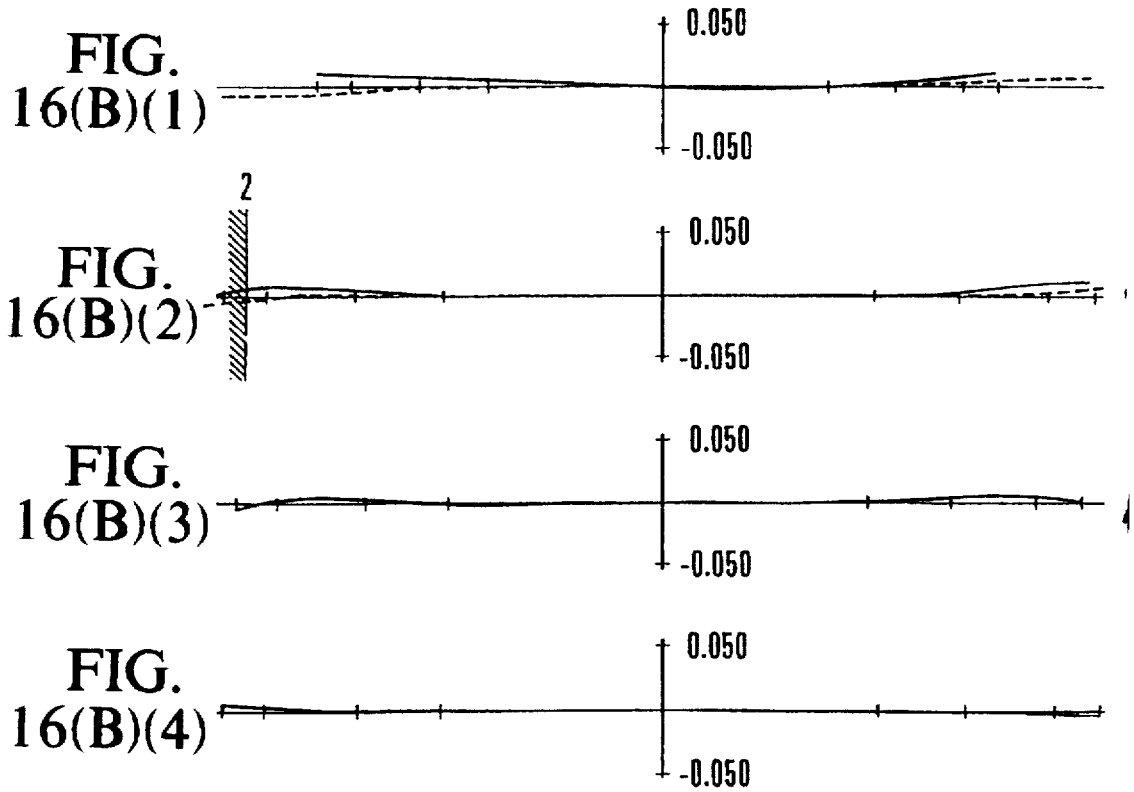

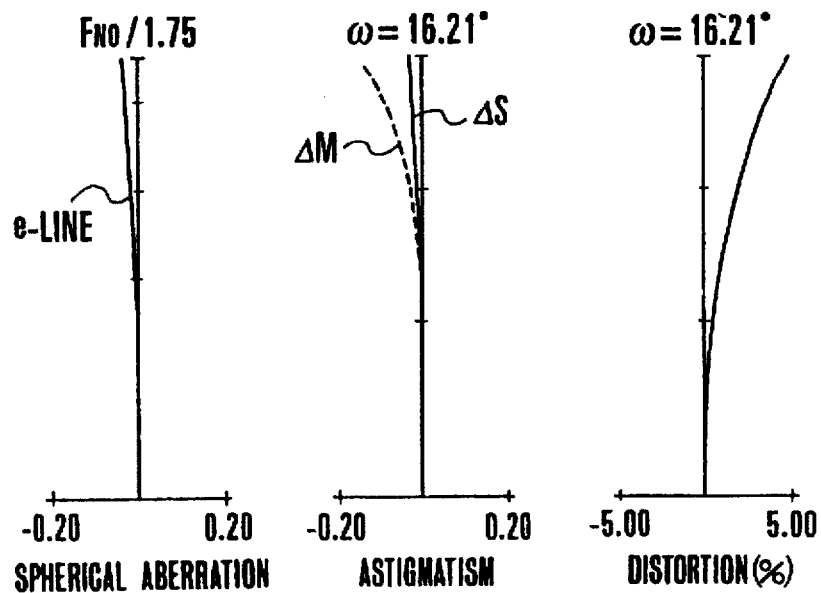
FIG.17(A)(1) FIG.17(A)(2) FIG.17(A)(3)
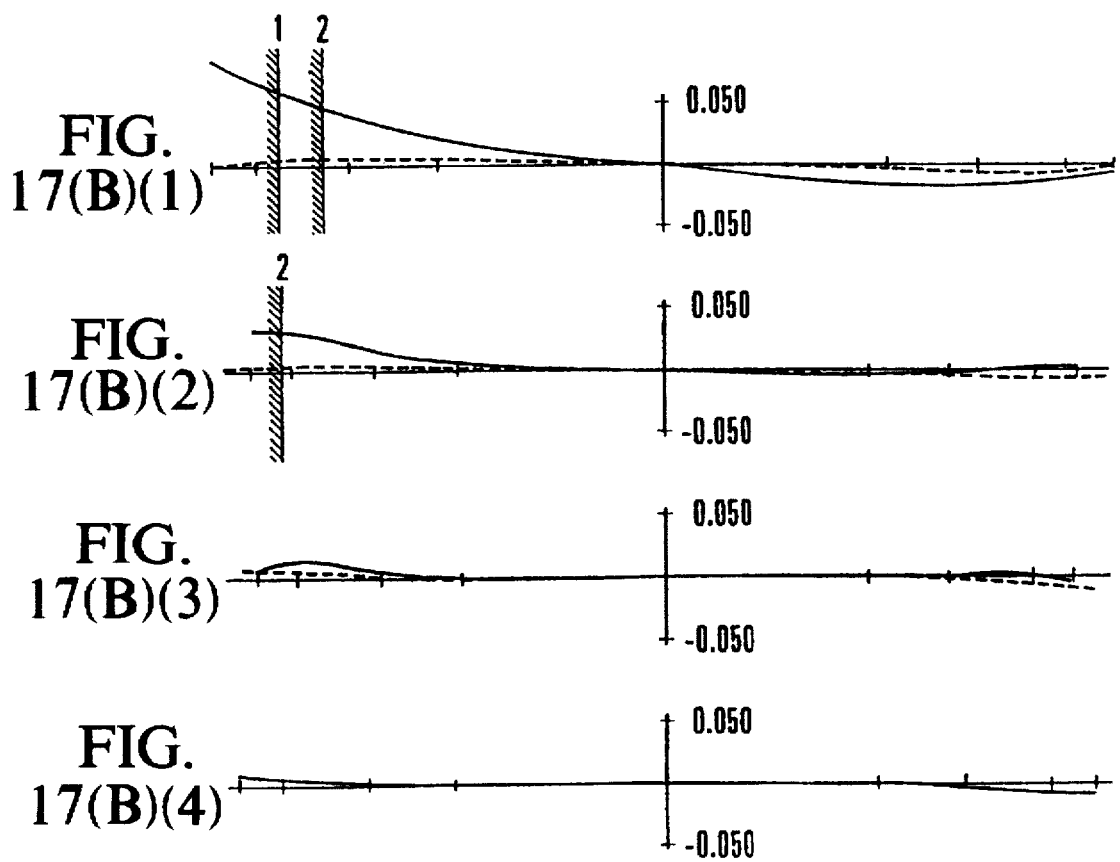

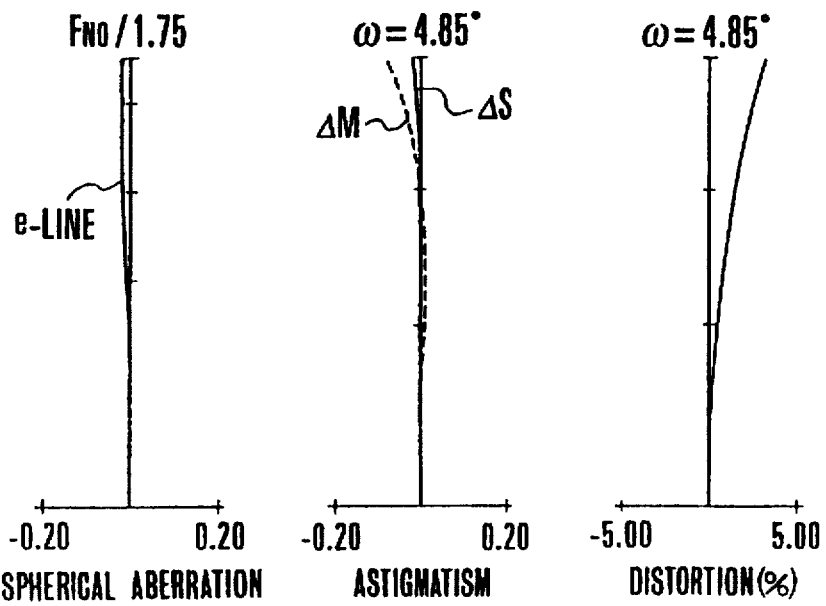
FIG.18(A)(1)  FIG.18(A)(2)  FIG.18(A)(3)
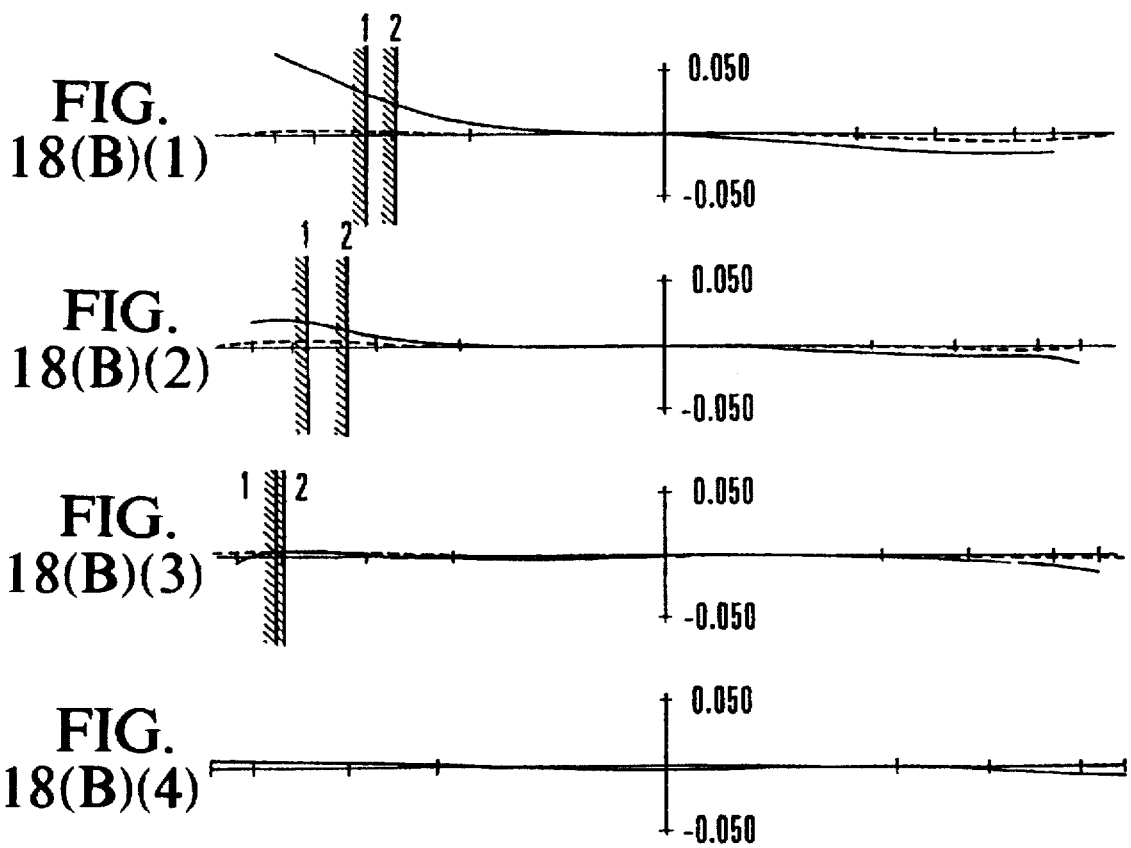
FIG. 18(B)(1)
FIG. 18(B)(2)
FIG. 18(B)(3)
FIG. 18(B)(4)

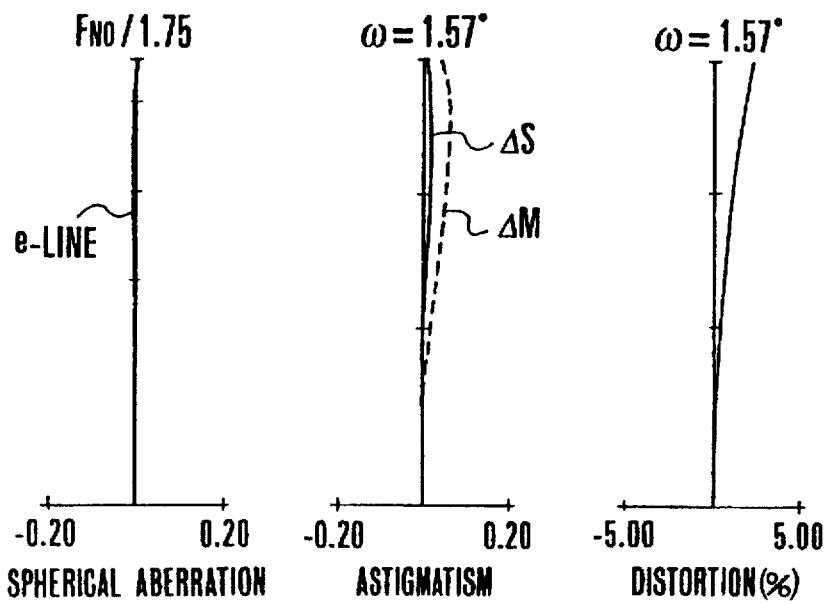
FIG.19(A)(1) FIG.19(A)(2) FIG.19(A)(3)
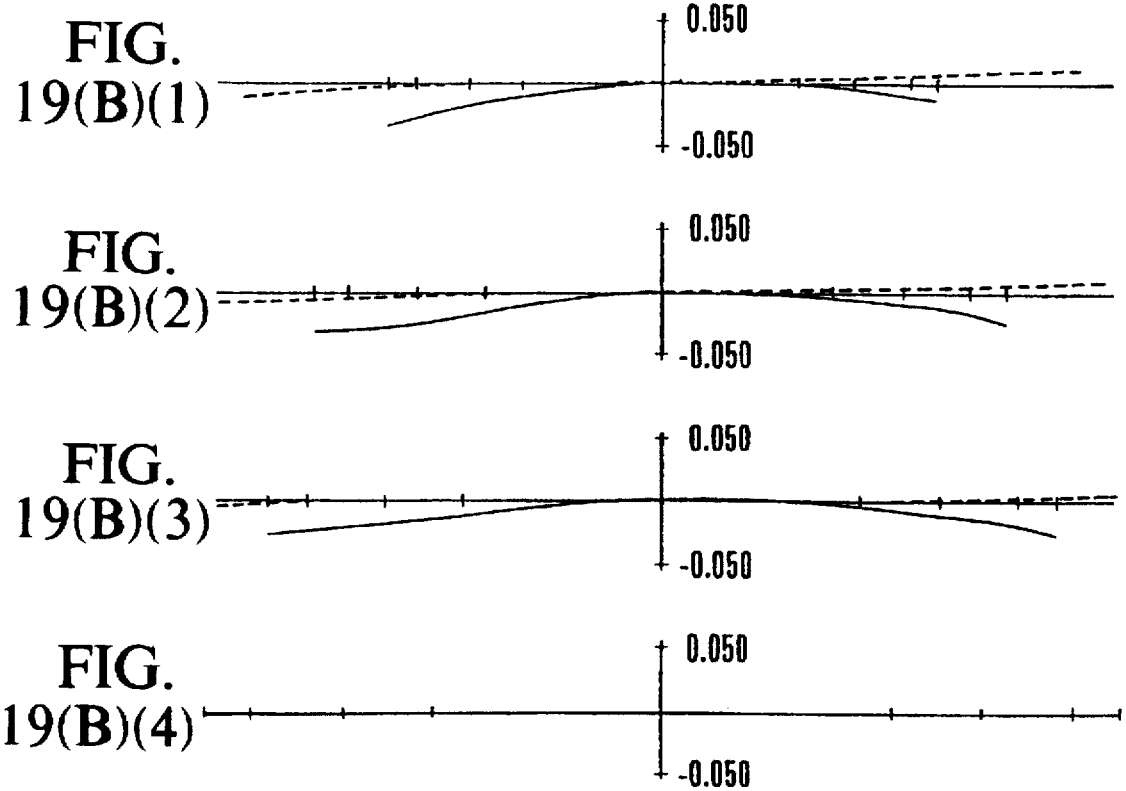

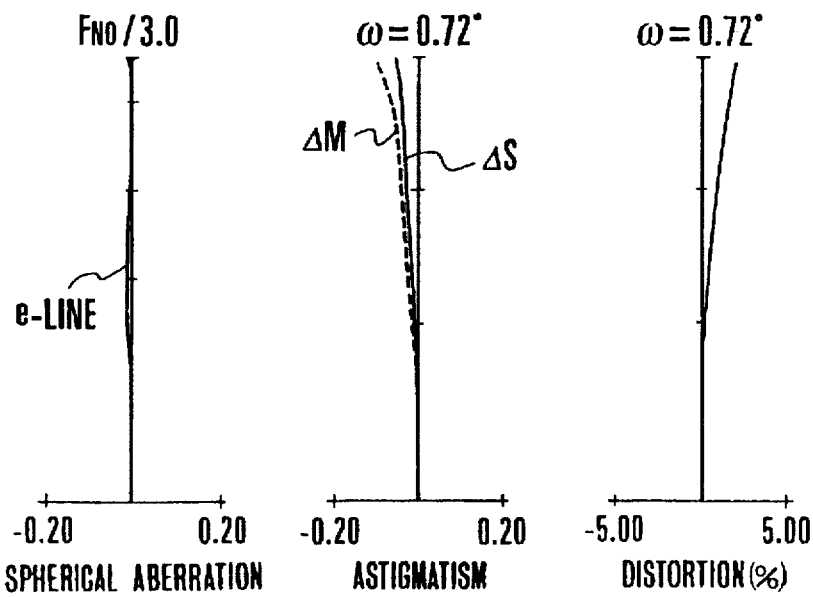
FIG.20(A)(1) FIG.20(A)(2) FIG.20(A)(3)
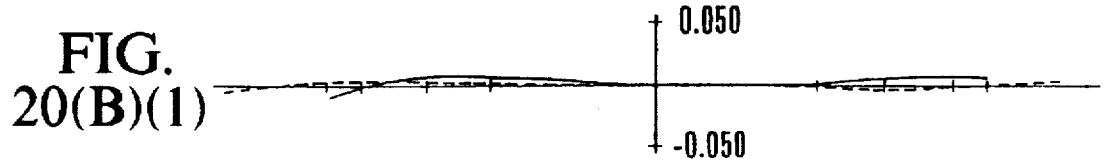
FIG. 20(B)(1)
FIG. 20(B)(2)
FIG. 20(B)(3)
FIG. 20(B)(4)

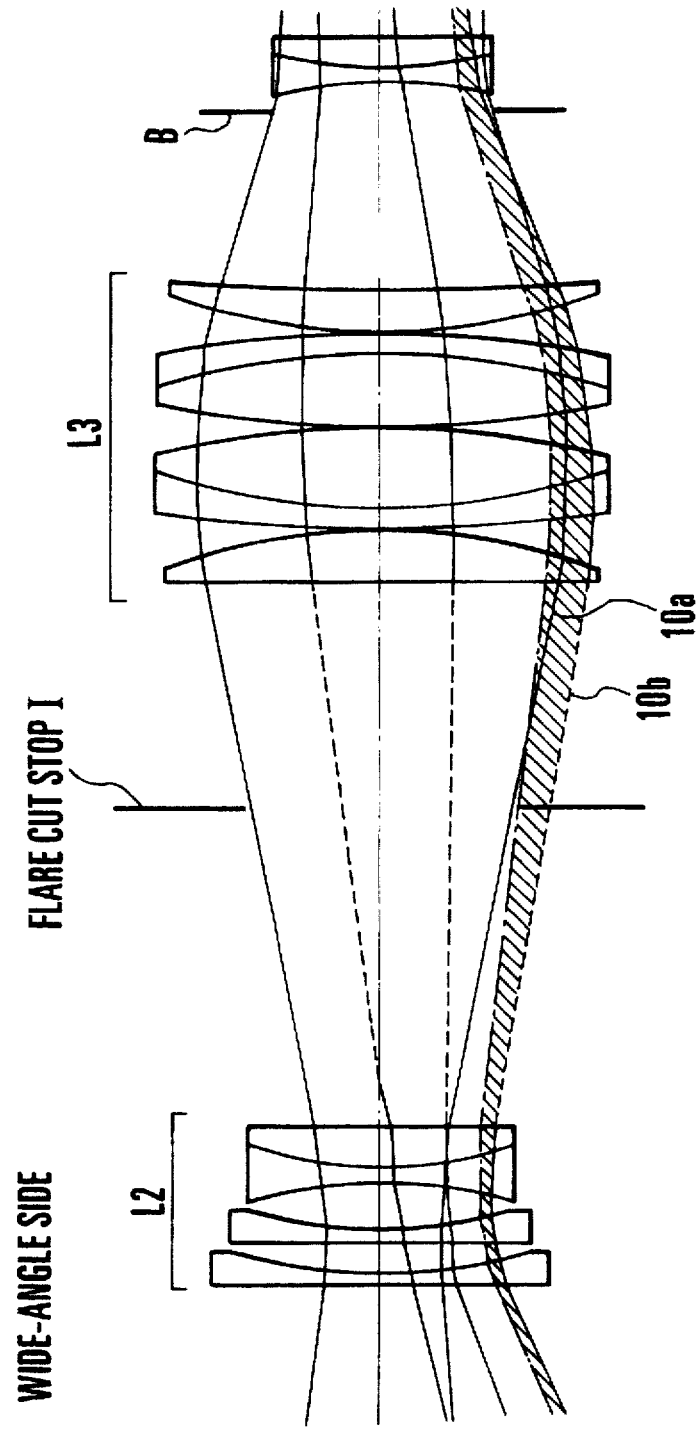

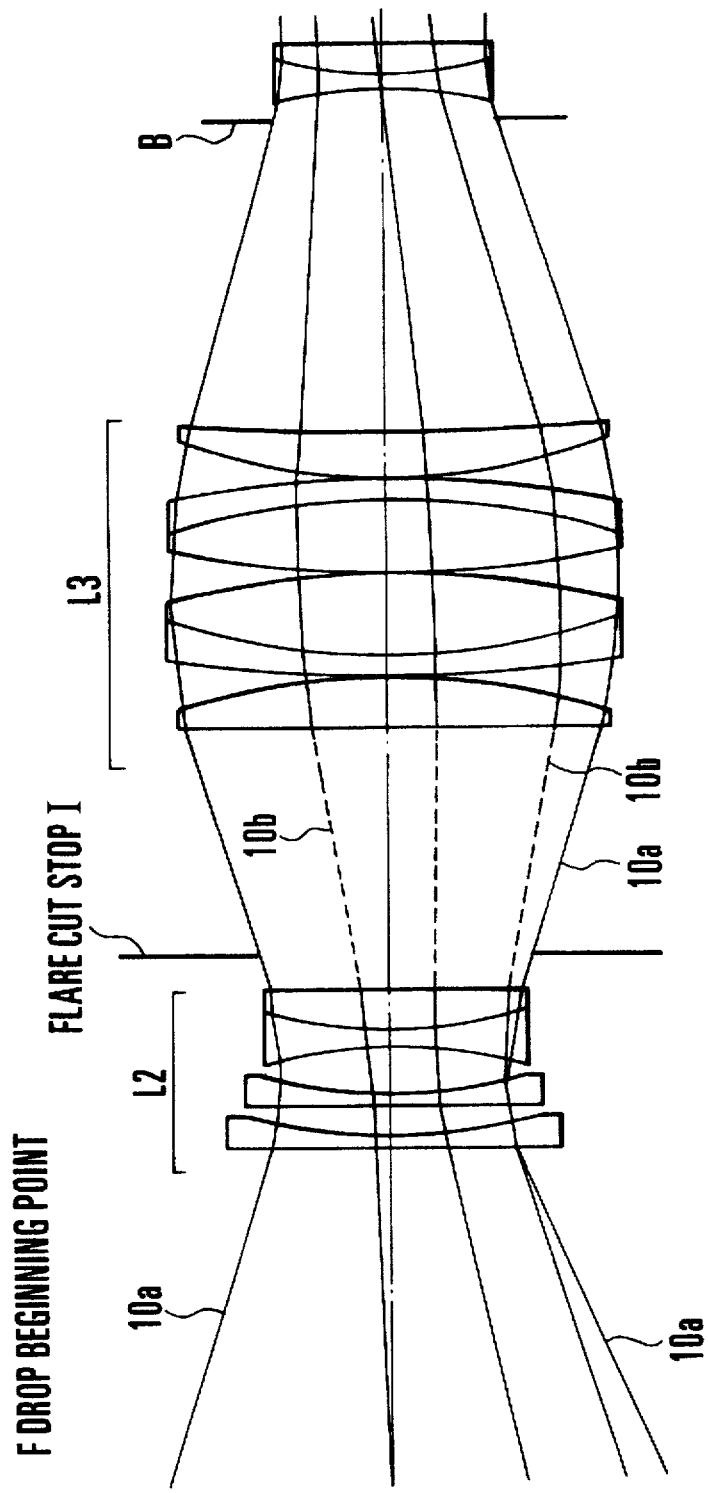
F I G. 23

ZOOM LENS

BACKGROUND OF THE INVENTION

1. Field of the Invention

This invention relates to zoom lenses of as high zoom ratio as 40 or thereabout having a flare cut stop suited particularly to TV cameras and, more particularly, to zoom lenses having a flare cut stop arranged within the lens system on zooming to vary its aperture diameter or its axial position so properly that a part of the off-axial light bundle which becomes a cause of flare or halo is cut to obtain good optical performance throughout the entire zooming range.

2. Description of the Related Art

It has been known to provide a zoom lens of greatly increased range comprising, from front to rear, a first lens unit having a positive refractive power for focusing (or front lens), a second lens unit having a negative refractive power and axially movable for varying the focal length (or variator), a third lens unit having a positive refractive power and axially movable for varying the focal length and for compensating for the image shift (or compensator) and a fourth lens unit having a positive refractive power, fixed and having the image forming function, totaling four lens units, wherein an arrangement is made such that, when zooming from the wide-angle end to the telephoto end, the variator and the compensator take an image magnification of −1× at the same time. Such a 4-unit type has found its use in many zoom lenses.

This 4-unit type of zoom lens has a property that when zooming from the wide-angle end to the telephoto end, the off-axial light bundle produces coma flare which becomes very large in a region from a zoom position slightly far from the wide-angle end to an intermediate zoom position, lowering the image contrast.

FIG. 24 is a schematic diagram of a zoom lens of the 4-unit type described above with rays of light traveling all the optical elements at a full open aperture in a zoom position near the wide-angle end where large coma flare is produced with a high possibility.

In FIG. 24, the ray tracing method is used on an on-axial F-number bundle of rays and two off-axial bundles of rays which go to the middle and maximum image heights in the image frame respectively. In the space between the second and third lens units, the solid lines are the on-axial F-number bundle of rays, the dot lines are the off-axial bundle of rays for the middle image height and the dot-and-dash lines are the off-axial bundle of rays for the maximum image height.

Now calling the central one of the rays of the off-axial bundle "principal ray" and the marginal one "lower rim ray", the principal ray passes considerably far from the optical axis to the lower side on the plane B of a stop that determines an F-number. It is then found that the lower rim ray travels the first lens unit and the compensator (third lens unit) at high heights from the optical axis. For this reason, it undergoes a strong refracting power and is forced to move upward. As a result, large coma flare is produced.

Zoom lenses having means for removing such flare have been proposed in Japanese Patent Publications Nos. Sho 51-21794 and Sho 56-52291.

In the former, a stop of variable aperture diameter is fixedly mounted to the barrel at a position in between the variator and the compensator. The diameter of aperture opening of the stop is made to vary with zooming, thus restricting the bundle of rays for the middle image height in the image frame.

In the latter, a stop of fixed aperture diameter is arranged in the space between the variator and the compensator on zooming to axially move in relation to the movement of the variator. Thus, the bundle of rays for the middle zone is limited in part at the margin throughout the entire zooming range.

To suppress the variation with zooming of aberrations, particularly, coma flare, it is necessary in the general case that the flare component is effectively removed without giving any influence to the on-axial bundle of rays.

By the way, what is disclosed in the Japanese Patent Publication No. Sho 51-21794 described above is that, while the bundle of rays for the maximum image height in the image frame is not restricted, only the bundle of rays for the middle image height is subjected to restriction. In the zoom lenses for use in television cameras, however, where it is capable of restricting only the bundle of rays for the middle zone is limited to a very small region of the zooming range which lies in the neighborhood of the wide-angle end. As mentioned before, it is also sure that no consideration is given about the influence on the coma flare that the lower rim ray for the maximum image height brings forth when passing through the first and third lens units. Again, in the same publication, the embodiments are illustrated as using mechanical means or plate cam for controlling the aperture diameter of the stop, it is difficult to freely make the control of the aperture diameter of the stop, if this stop is stopped down in cooperation with the iris for determining the F-number, or if a converter or extender is attached. Further, the high range zoom lens for the television camera has its variator and compensator made to move longer distances. Therefore, an additional problem arose in that the plate cam, too, gets a longer length and the zoom lens, too, gets heavier as a whole.

The zoom lens proposed in Japanese Patent Publication No. Sho 56-52291, as described before, uses the axially movable stop of fixed aperture diameter in restricting part of the off-axial bundle at the lower rim ray throughout the entire zooming range. Therefore, a problem arose in that there is a possibility of occurrence of a situation where even the useful rays well corrected for aberrations are shut out. Also, it becomes necessary to use a mechanism for moving the stop. Therefore, there is a problem that the complicated form results and the weight is increased.

SUMMARY OF THE INVENTION

An object of the invention is to provide a zoom lens whose zoom ratio is considerably high and wherein the coma flare for the maximum image height owing particularly to the influence that the components of positive refractive powers, or the first and third lens units, give, is removed.

To this end, the invention has a characteristic feature that the zoom lens comprises, from front to rear, at least a first lens unit of positive refractive power, a second lens unit of negative refractive power, a flare cut stop for removing the flare component of the maximum off-axial bundle, or the lower rim ray, a third lens unit of positive refractive power, zooming being performed by moving the second and third lens units, wherein the aperture diameter of the stop is made variable, or the stop is made movable.

Another object is to provide a method of finding that region in the zooming range which is most desired to reduce the flare component that should be cut so that the control of the stop is made at least throughout this region.

Yet another object is to provide a zoom lens which, though its zoom ratio is very high, is well corrected for aberrations.

A further object is to provide a driving system for the stop of small size and high responsibility.

BRIEF DESCRIPTION OF THE DRAWINGS

FIG. 2 is a schematic sectional view, partly in block form, of a control device for the flare cut stop of the invention.

FIG. 3 is a schematic sectional view, partly in block form, of another control device for the flare cut stop of the invention.

FIG. 4 is a schematic sectional view, partly in block form, of another control device for the flare cut stop of the invention.

FIG. 5 is a schematic sectional view, partly in block form, of another control device for the flare cut stop of the invention.

FIG. 6 is a schematic sectional view, partly in block form, of another control device for the flare cut stop of the invention.

FIGS. 7(A)(1)–7(A)(3) and 7(B)(1)–7(B)(4) are graphic representations of the various aberrations of a numerical example 1 of the invention in the wide-angle end.

FIGS. 8(A)(1)–8(A)(3) and 8(B)(1)–8(B)(4) are graphic representations of the various aberrations of the numerical example 1 of the invention in a middle position (for a focal length of 19.49 mm).

FIGS. 9(A)(1)–9(A)(3) and 9(B)(1)–9(B)(4) are graphic representations of the various aberrations of the numerical example 1 of the invention in another middle position (for a focal length of 69.78).

FIGS. 10(A)(1)–10(A)(3) and 10(B)(1)–10(B)(4) are graphic representations of the various aberrations of the numerical example 1 of the invention at an F drop beginning point.

FIGS. 11(A)(1)–11(A)(3) and 11(B)(1)–11(B)(4) are graphic representations of the various aberrations of the numerical example 1 of the invention in the telephoto end.

FIGS. 16(A)(1)–16(A)(3) and 16(B)(1)–16(B)(4) are graphic representations of the various aberrations of a numerical example 2 of the invention in the wide-angle end.

FIGS. 17(A)(1)–17(A)(3) and 17(B)(1)–17(B)(4) are graphic representations of numerical examples 2 and 3 of the invention in a middle position (for f=18.93 mm).

FIGS. 18(A)(1)–18(A)(3) and 18(B)(1)–18(B)(4) are graphic representations of the numerical examples 2 and 3 of the invention in another middle position (for f=64.82 mm).

FIGS. 19(A)(1)–19(A)(3) and 19(B)(1)–19(B)(4) are graphic representations of the various aberrations of the numerical examples 2 and 3 of the invention at the F drop beginning point.

FIGS. 20(A)(1)–20(A)(3) and 20(B)(1)–20(B)(4) are graphic representations of the numerical examples 2 and 3 of the invention in the telephoto end.

FIG. 22 is a fragmentary diagram of the lens system in a middle focal length position with the optical function of the invention shown.

FIG. 23 is a fragmentary diagram of the lens system at the F drop beginning point with the optical function of the invention shown.

DETAILED DESCRIPTION OF THE PREFERRED EMBODIMENTS

Figure 1:
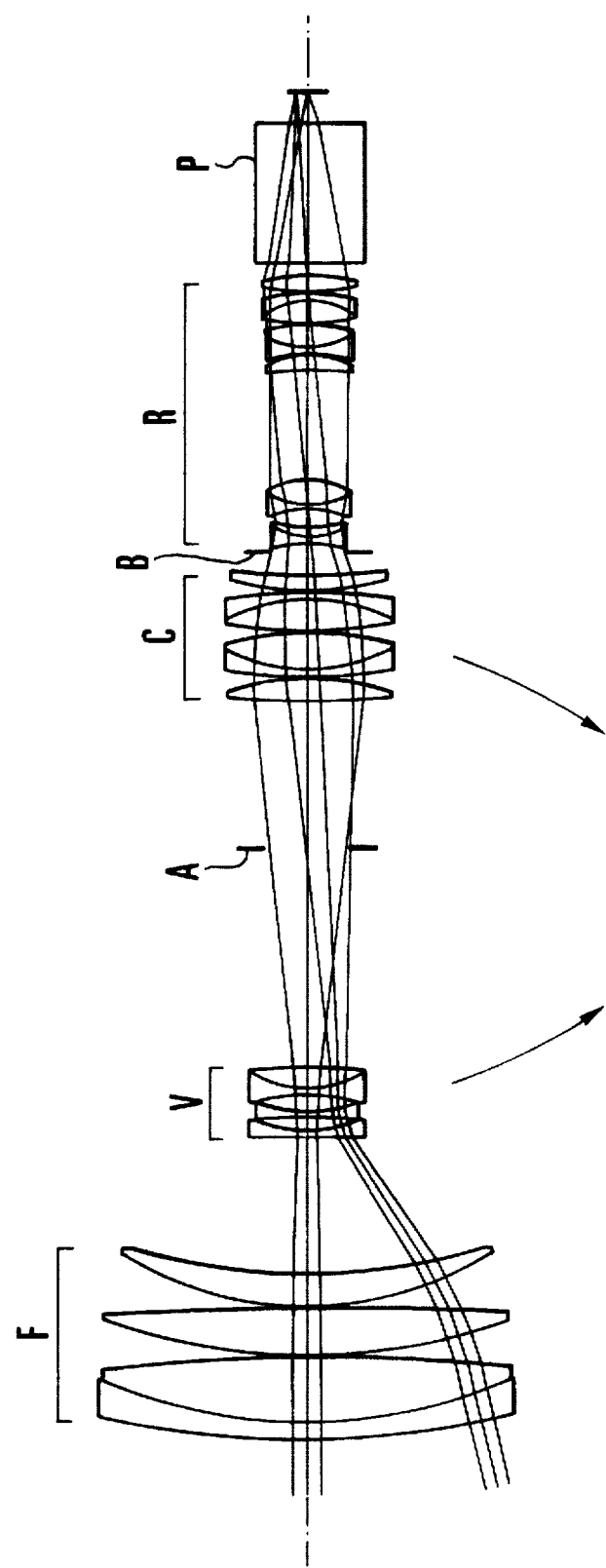
FIG. 1 is a diagram showing the longitudinal section and optical path of a first embodiment of a zoom lens according to the invention.
Figure 12:
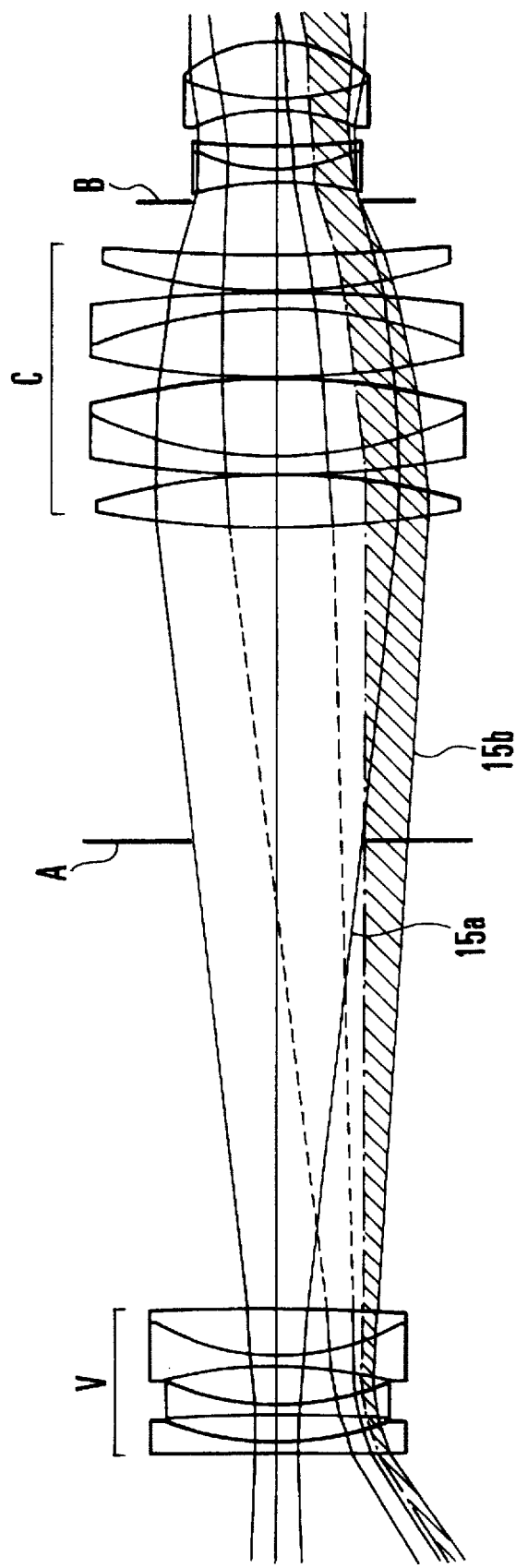
FIG. 12 is a fragmentary diagram of the lens system in the wide-angle end with the optical function of the invention shown.
Figure 13:
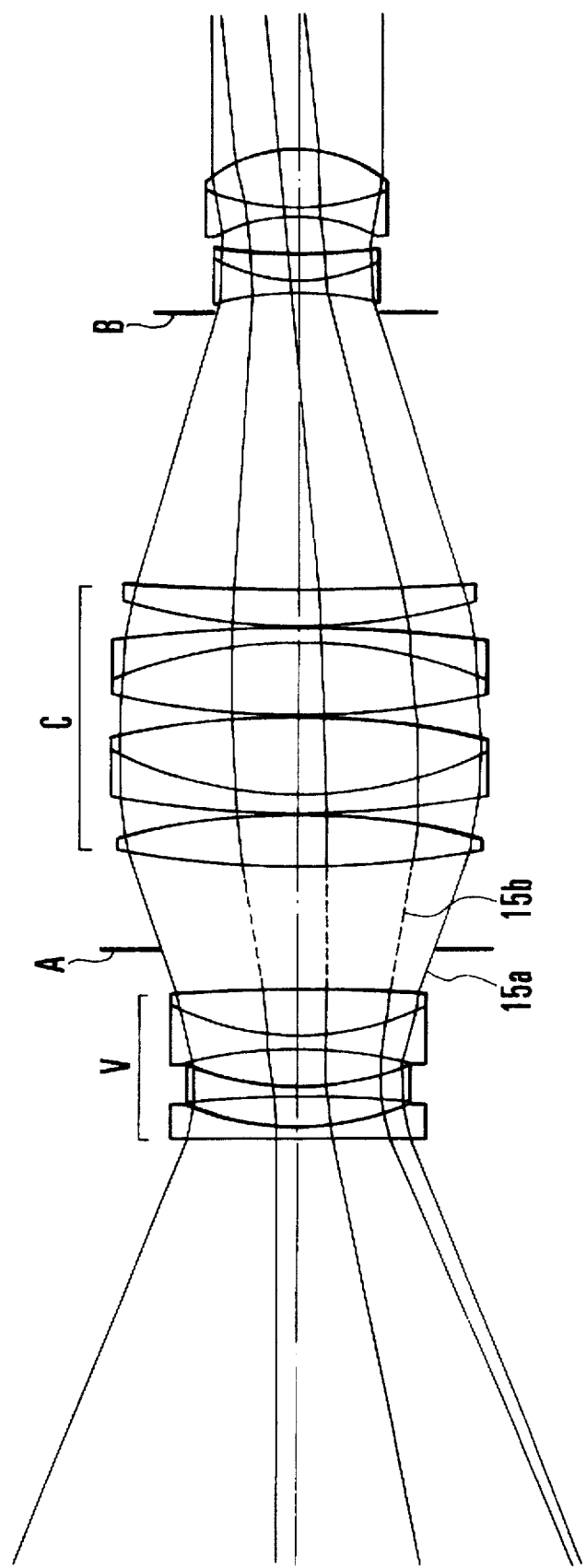
FIG. 13 is a fragmentary diagram of the lens system at the F drop beginning point with the optical function of the invention shown.

FIG. 1 shows an off-axial paraxial bundle of rays through the zoom lens of the first embodiment of the invention. FIG. 12 and FIG. 13 in enlarged scale show the change of the off-axial paraxial bundle through some lens units between certain values of the focal length. In these drawings, the zoom lens comprises, from front to rear, a first lens unit (front lens unit) F having a positive refractive power and arranged on focusing to an object to be photographed to move axially and on zooming to remain stationary, a second lens unit (variator) V having a negative refractive power and arranged on zooming to move axially to vary the focal length, a third lens unit (compensator) C having a positive refractive power and arranged on zooming to move axially to perform the functions of varying the focal length and of compensating for the image shift, the arrows indicating the loci of motion as zooming from the wide-angle end to the telephoto end, and a fourth lens unit (relay lens) R having a positive refractive power and the image forming function, followed by 3 P prisms P as the color separation optical system shown by an optical block.

In here, reference character B denotes an iris for determining the F-number for the zoom lens. Reference character A denotes a flare cut stop of variable aperture diameter concerning the invention. For a certain region in the zooming range, the bundle of rays for the maximum image height is cut in part (at the lower side) by the flare cut stop.

The zoom lens of the invention is first described in respect to the optical aspect. In this first embodiment, as shown in FIG. 1, the zoom lens has four lens units or is of the 4-unit type. To give it a high zoom ratio, the positions at which the second and third lens units take an image magnification of $-1\times$ are made to coincide with each other as they move when zooming from the wide-angle end to the telephoto end. Another feature is that determination of the position for the flare cut stop is made under the conditions that the on-axial F-number bundle is not cut over the entire zooming range and that only the lower rim ray is cut as the aperture diameter of this stop varies with zooming, since the aberration of this ray gets large on the wide-angle side particularly at an intermediate zooming region (between the values of $6^{\sqrt{}}Z$ and $\sqrt{Z}$ where Z is the zoom ratio).

A more detailed explanation is given by reference to FIG. 12 and FIG. 13 below.

FIG. 12 shows the on-axial bundle of rays and an off-axial paraxial bundle of rays for the maximum image height passing through the variator V and the compensator C in a zoom position near the wide-angle end with the iris B at full open aperture. Since the lower rim ray 15b lies outside the on-axial F-number ray 15a, the lower marginal part of the off-axial bundle is shut off as shown by hatching.

Particularly in a zooming region which extends from 6 $\sqrt{Z}$ to $\sqrt{Z}$, the rays behave like that shown in FIG. 12. This permits the off-axial bundle to be treated alone effectively.

Meanwhile, FIG. 13 shows a zoom position at which the F-number begins to drop. Since the lowest marginal ray 15b of the off-axial paraxial bundle for the maximum image height passes inside the lower marginal ray 15a of the on-axial F-number bundle, the off-axial bundle cannot be cut in any part.

However, when the iris B is stopped down, the F-number increases, or when a converter is attached, or an incorporated extender is erected, the focal length changes at any zooming station. In such cases, the heights of the marginal rays of the on-axial and off-axial bundles change in different ways from each other in the space between the variator V and the compensator C. In the situation when the lower marginal rays of the off-axial bundle go to the outside of the F-number ray of the on-axial bundle, therefore, it becomes possible for the stop A to cut part of these lower marginal rays.

Particularly in the present embodiment, to insure that the on-axial F-number bundle is not cut at any zooming station, a condition is set forth as follows:

$$D \geq Da \quad (1)$$

where D is the aperture diameter of the flare cut stop A, and Da is the diameter of the on-axial F-number bundle on a plane of the stop A.

Particularly for the zooming region of from $6\sqrt{Z}$ to $\sqrt{Z}$ where the aberration of the lower rim ray increases largely, not only the condition (1) described above is satisfied, but also the aperture diameter D of the stop A is made to vary in a range given by the following expression:

$$Dm > D \quad (2)$$

where Dm is the diameter of the off-axial bundle for the maximum image height as determined on the plane of the stop A. The coma flare component of the off-axial bundle is thus effectively shut off to improve the imagery.

As described above, because the invention provides a possibility of effectively cutting the flare component of the off-axial bundle, great improvements of the performance are achieved. Another possibility is to make positive use of such an effect of removing the flare component. So, the refractive powers of the variator and the compensator can be strengthened to thereby shorten the zoom section comprised of the variator and the compensator. At the same time, the distance from the iris B to the front vertex, too, can be shortened to thereby minimize the diameter of the front lens members. With regard to the zoom lens system, it is thus made possible to improve the compact form and reduce the weight.

Next, the first embodiment is described in connection with a specific example and the numerical data.

In a numerical example 1 to be described more fully later, the flare cut stop A is driven by electrically operated control means. Mainly at the full open aperture of the iris B for determining the F-number, the off-axial bundle is deprived of the flare component. The values of the parameters for a number of zooming positions in such a case are listed in Table 1.

Since, in the numerical example 1, the F drop begins at a zoom position for a focal length of f=256.6 mm, the diameter of the on-axial F-number bundle gradually increases from Da=28.0 mm at the wide-angle end to Da=46.0 mm at the beginning point of the F drop, and therefrom decreases to Da=35.6 mm at the telephoto end by the F drop.

Figure 14:
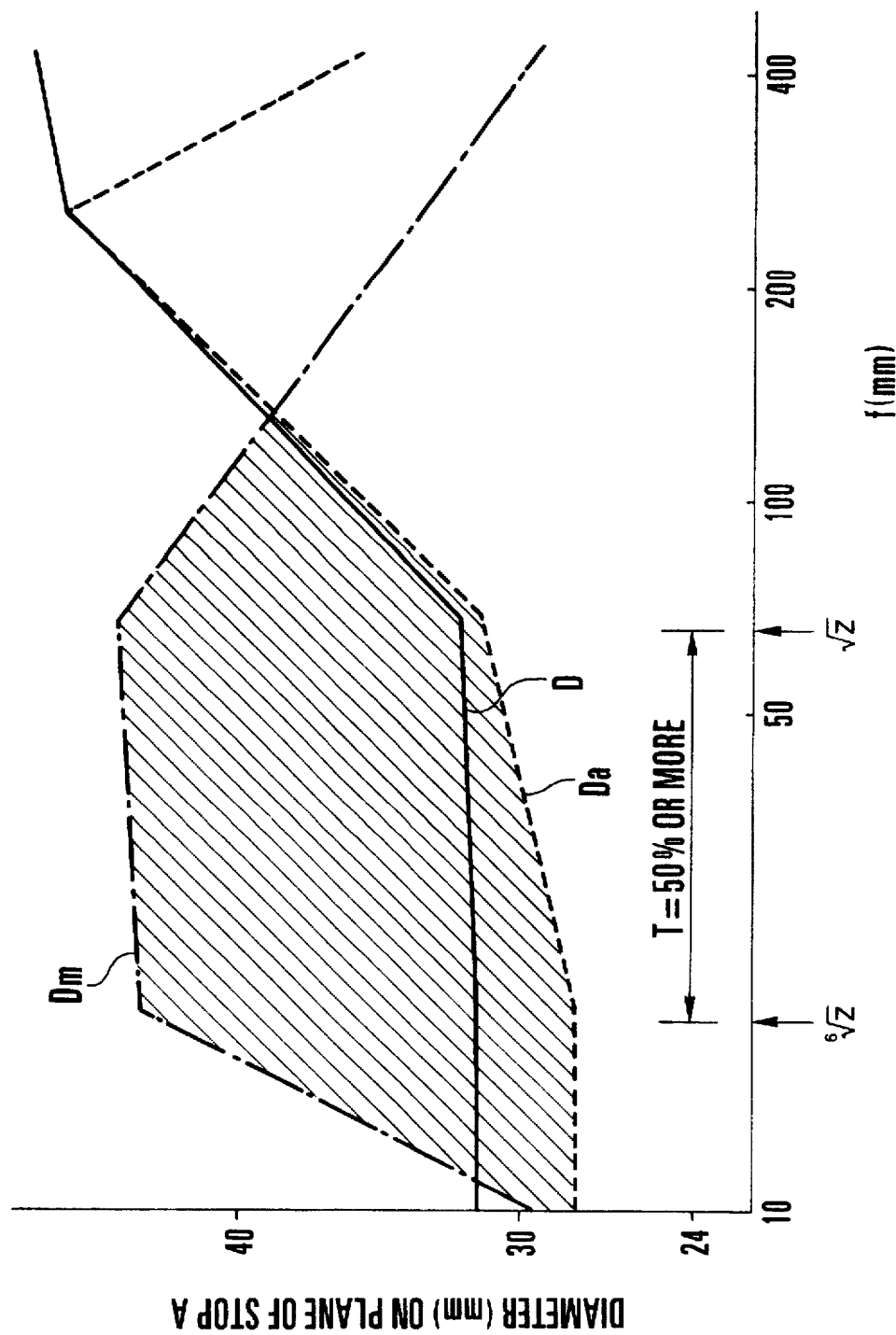
FIG. 14 is a graph of the variation of the size of aperture opening of the flare cut stop with zooming.

In FIG. 14, for the numerical example 1, there is shown the variation of the aperture diameter of the flare cut stop A with zooming. The abscissa is in the focal length and the ordinate represents the diameter on the plane of the flare cut stop A. In this graph, a solid line curve indicates the aperture diameter (D) of the flare cut stop, a dot line curve indicates the diameter (Da) of the on-axial F-number bundle, and a dot-and-dash line curve indicates the diameter (Dm) of the off-axial bundle for the maximum image height. The flare cut stop A is made to operate in a zooming region of from the wide-angle end to a focal length of f=130 mm, that is, within a hatched area enclosed by the dot line curve and the dot-and-dash line curve. With this, it becomes possible to cut the off-axial bundle in part. In the present embodiment, particularly for a region of from f=19.49 mm to f=69.78 mm where the aberrations of the off-axial rays deteriorate, the aperture diameter (D) of the flare cut stop A is adjusted so that the off-axial rays for the maximum image height illuminate the corners at a rate of about 50%. When zooming in this region, the diameter D varies from 31.5 mm at f=19.49 mm to 32.2 mm at f=69.78 mm. For the wide-angle end, D=31.5 mm, for the F drop beginning point of f=256.6 mm, D=46.0 mm as is equal to the diameter (Da) of the on-axial F-number bundle, and for the telephoto end, no limitation is laid if D>Da=35.6 mm, but it is taken D=47.0 mm so that the aperture diameter D increases monotonously with zooming from the wide-angle end to the telephoto end. With the use of such a control, the electrically, mechanically operated stop improves its tracing ability, thus advantageously removing the flare.

Next, using FIG. 2, a process for controlling the aperture diameter of the stop A is described below.

In FIG. 2, the variator V and the compensator C are supported by respective holders 18 and 19. The holders 18 and 19 have radial pins movably fitted in a linear cam 16 and an arcuate cam 17. As the arcuate cam 17 rotates, the variator V and the compensator C move along a common optical axis to effect zooming. A zoom position detecting member 22 such as potentiometer or encoder is connected to the arcuate cam 17 and produces an output signal Z representing the current zooming position which is applied to a control circuit 23.

Based on the signal Z of the zooming position, the control circuit 23 determines the direction and amount to and by which a stop driving member 24 such as electric motor or IG meter is to rotate. The result is sent as a drive signal Θ to this member 24.

The driving member 24 accurately and reliably rotates on the basis of the drive signal Θ, while driving a stop mechanism 20 through a linkage in the form of a gear train or an endless belt.

The stop mechanism 20 is constructed with inclusion of a rotary ring arranged on rotation to open or close the flare cut stop A. Rotation of the stop driving member 24 is translated by this mechanism 20 to vary the aperture diameter of the stop A.

Another stop control method is shown in FIG. 3 where two zoom position detecting members 25 and 26 are used as means for detecting the axial positions of the variator V and the compensator C. Being connected to the holders 18 and 19, the detecting members 25 and 26 produce output signals Z and z of the current zooming position which are applied to the control circuit 23. The subsequent processing is similar to that of FIG. 2. It should be noted that this method is applicable even to another type of zooming control system in which instead of using the mechanical members, an electronic cam arrangement is used for driving the variator V and the compensator C independently of each other.

As is apparent from the foregoing, since, in the control methods of FIGS. 2 and 3, the aperture diameter of the stop is electrically controlled, it is possible to achieve a further reduction of the weight. Also, since the rate at which the aperture diameter of the stop varies with zooming can be altered easily and most suitably by modifying the control circuit, it becomes possible to shut the flare component off the off-axial bundle with high accuracy.

Next, using FIG. 4, another method of controlling the aperture diameter of the stop A and a process using the same are described below.

In FIG. 4, with regard to the zooming control mechanism, it is similar to the example of FIG. 2. The zoom position detecting member 22 such as potentiometer, or encoder is connected to the arcuate cam 17 and produces an output signal Z which is applied to a computation circuit 27.

The computation circuit 27 derives a quantity $\phi'$ related to the aperture diameter of the stop from the zoom position signal Z as a parameter on the basis of a certain equation $\phi'=f(Z)$ and produces an output signal $\phi$ of the aperture diameter which is applied to the control circuit 23.

Based on the aperture diameter signal $\phi$, the control circuit 23 determines the direction and amount to and by which the driving member 24 such as electric motor or IG meter is to rotate and sends the result as the drive signal $\Theta$ to the driving member 24.

The stop driving member 24 rotates in accurate and reliable response to the driving signal $\Theta$, while driving a stop mechanism 20 through a linkage in the form of a gear train or an endless belt.

The stop mechanism 20 constituting the flare cut stop A is so constructed that when it rotates, the stop A opens or closes. The rotation of the stop driving member 24 is translated by the stop mechanism 20 to vary the aperture diameter of the stop A.

It is to be noted that the zoom position detecting member may otherwise be connected to either the holder 18 for the variator V or the holder 19 for the compensator C. Even in this case, a similar process applies. Moreover, such a modified method is applicable to a system in which instead of using the mechanical members in moving the variator and the compensator, an electronic cam type can be used for driving them independently of each other.

It will be appreciated from the foregoing that since, in the control method of FIG. 4, the aperture diameter of the stop A is electrically controlled, it is possible to achieve a further reduction of the weight. Also since the rate at which the aperture diameter of the stop A varies with zooming can be altered easily and suitably by modifying the relationship equation for the computation circuit, it becomes possible to shut the flare component off the off-axial bundle with a higher accuracy.

Next, using FIG. 5, another method of controlling the aperture diameter of the stop A and a process using the same are described below.

In FIG. 5, with regard to the zooming mechanism, its structure is similar to the example of FIG. 2. The zoom position detecting member 22 such as potentiometer or encoder is connected to the arcuate cam 17. The zoom position signal Z obtained from the zoom position detecting member 22 is sent to the computation circuit 27.

Meanwhile, a storage circuit 28 comprised of a ROM and a RAM stores the data of a quantity $\phi'$ related to the aperture diameter of the stop and the data of the zoom position Z' in one-to-one correspondence.

In the computation circuit 27, the signal Z of the current zoom position is compared with the information for the zoom position from the storage circuit 28 to find the value of the quantity related to the aperture diameter of the stop.

The result is applied as the aperture diameter signal $\phi$ to the control circuit 23.

Based on the aperture diameter signal $\phi$, the control circuit 23 determines the direction and the amount to and by which the stop driving member 24 such as electric motor or IG meter is to rotate and produces the result as a driving signal $\Theta$.

The stop driving member 24 rotates in response to the driving signal $\Theta$, while driving the stop mechanism 20 through a linkage in the form of a gear train or endless belt.

The stop mechanism 20 constituting the flare cut stop A is so constructed that when it rotates, the stop A opens or closes. The rotation of the stop driving member 24 is translated to vary the aperture diameter.

It is to be noted that the zoom position detecting member may otherwise be connected to the holder 18 for the variator V or the holder 19 for the compensator C as shown in FIG. 3. Even in this case, a similar process can be carried out. Such a modified method is applicable even to a system in which instead of using the mechanical members for moving the variator and compensator, an electronic cam type is used to drive them independently of each other.

It will be appreciated from the foregoing that since, in the control method of FIG. 5, the aperture diameter is electrically controlled, it is possible to achieve a further reduction of the weight. Also, since the rate at which the aperture diameter of the stop varies with zooming can be altered easily and most suitably by rewriting the data in the storage circuit, it becomes possible to shut the flare component off the off-axial bundle with high accuracy.

Next, using FIG. 6, another method of controlling the aperture diameter of the stop A and a process using the same are described below.

In FIG. 6, with regard to the zooming mechanism, its structure is similar to the example of FIG. 2. The zoom position detecting member 22 such as potentiometer or decoder is connected to the arcuate cam 17. The zoom position signal Z from the zoom position detecting member 22 is sent to the computation circuit 27.

An iris mechanism 21 constituting the iris B for determining the F-number is so constructed that when it is rotated, the iris B opens or closes.

An F-number detecting member 29 may be the potentiometer or encoder connected to the iris mechanism 21, or its output may be the auto-iris signal (not shown) from the camera side, or the driving signal (not shown) for the iris mechanism 21. In essence, an F-number signal F is sent to the computation circuit 27.

A focal length conversion detecting member 30 tests if a converter, an incorporated extender (IE) or like device for converting the focal length of the entire zooming range is in use. The result is sent as a focal length conversion signal IE to the computation circuit 27.

Meanwhile, the storage circuit 28 of the RAM and ROM keeps the values of the quantity $\phi'$ related to the aperture diameter of the stop A in relationship with the data Z' of the zoom position, the data F' of the F-number and the converted data IE' of the focal length.

As the three detecting members described above produce the output signals Z, F and IE, the computation circuit 27 accesses the storage circuit 28 to look up the three tables of data Z', F' and IE' by comparison and finds out a value of the quantity related to the aperture diameter of the stop. The result is sent as the signal $\phi$ of the current aperture diameter to the control circuit 23.

Based on the aperture diameter signal $\phi$, the control circuit 23 determines the direction and the amount to and by which the stop driving member 24 such as electric motor or IG meter is to rotate and produces an output which is applied as the driving signal Θ to the driving member 24.

The stop driving member 24 rotates in response to the driving signal Θ, while accurately and reliably driving the stop mechanism 20 through a linkage in the form of a gear train or an endless belt.

The stop mechanism 20 constituting the flare cut stop A is so constructed that when it rotates, the stop A opens or closes. The rotation of the stop driving member 24 is translated by the stop mechanism 20 to vary the aperture diameter.

It is to be noted that the zoom position detecting member may otherwise be connected to the variator holder 18 or the compensator holder 19. Even in this case, a similar process can be carried out. Such a modified method is applicable even to the electronic cam type system in which without using the mechanical members for moving the variator and the compensator, they can be driven independently of each other.

It will be appreciated from the foregoing that since, in the control method of FIG. 6, the aperture diameter of the stop is electrically controlled, it is possible to achieve a further reduction of the weight. Since the rate at which the aperture diameter of the stop varies with variation of the zoom position and the F-number and with selection of the normal and the converted focal lengths can be altered easily and optimally by rewriting the data in the storage circuit, it becomes possible to more effectively the flare component off the off-axial bundle.

Next, a numerical example 1 of the invention is shown. In the numerical data for the example 1, ri is the radius of curvature of the i-th lens surface, when counted from the object side, di is the i-th axial lens thickness or air separation, when counted from the object side, and ni and vi are respectively the refractive index and Abbe number for the spectral d-line of the glass of the i-th lens element, when counted from the object side.

r1–r8 are a front lens unit F having a positive refractive power. When focusing on an object to be photographed, it moves axially. When zooming, it remains stationary. r9–r15 are a variator V having a negative refractive power. To perform the function of varying the focal length, it moves axially when zooming. r16 is a flare cut stop A of variable aperture diameter. r17–r26 are a compensator C having a positive refractive power. To perform the function of varying the focal length and compensate for the image shift with zooming, it moves axially. r27 is an iris B for determining the F-number of the zoom lens. r28–r43 are a relay lens R having a positive refractive power. It functions to form an image of the object. r44–r45 are a prism or dummy glass P.

Table 1 shows the relationship of the F-number and the focal length with the variable separations and the parameters of the invention in the numerical example 1.

The aberrations for the spectral e-line of the zoom lens of the numerical example 1 are shown in FIGS. 7(A)(1)–7(A)(3) and 7(B)(1)–7(B)(4) (for f=10.0 mm), FIGS. 8(A)(1)–8(A)(3) and 8(B)(1)–8(B)(4) (for f=19.49 mm), FIGS. 9(A)(1)–9(A)(3) and 9(B)(1)–9(B)(4) (for f=69.78 mm), FIGS. 10(A)(1)–10(A)(3) and 10(B)(1)–10(B)(4) (for f=256.6 mm) and FIGS. 11(A)(1)–11(A)(3) and 11(B)(1)–11(B)(4) (f=440.0 mm).

In the aberration curves, the part on the left hand side of the hatching t is shut out. It is obvious that the effect of removing the lower rim rays or flare component is great at or near f=19.49 mm and 69.78 mm.

NUMERICAL EXAMPLE 1 f = 10–440    Fno = 1:1.75–3.0    2ω = 57.62°–1.43°

F:

| | | | | | |
|---|---|---|---|---|---|
| r1 = 324.958 | d1 = 5.50 | n1 = 1.76168 | v1 = 27.5 |
| r2 = 177.107 | d2 = 0.70 | | |
| r3 = 175.374 | d3 = 22.26 | n2 = 1.43496 | v2 = 95.1 |
| r4 = −850.247 | d4 = 0.30 | | |
| r5 = 192.777 | d5 = 17.69 | n3 = 1.43496 | v3 = 95.1 |
| r6 = −1915.564 | d6 = 0.30 | | |
| r7 = 126.416 | d7 = 11.75 | n4 = 1.49845 | v4 = 81.6 |
| r8 = 238.209 | d8 = Variable | | |

V:

| | | | |
|---|---|---|---|
| r9 = −3765.000 | d9 = 2.00 | n5 = 1.82017 | v5 = 46.6 |
| r10 = 52.963 | d10 = 4.41 | | |
| r11 = −379.386 | d11 = 1.80 | n6 = 1.77621 | v6 = 49.6 |
| r12 = 48.880 | d12 = 6.70 | | |
| r13 = −67.492 | d13 = 1.80 | n7 = 1.77621 | v7 = 49.6 |
| r14 = 44.337 | d14 = 7.69 | n8 = 1.93306 | v8 = 21.3 |
| r15 = −488.583 | d15 = Variable | | |
| r16 = (Stop) | d16 = Variable | | |

C:

| | | | |
|---|---|---|---|
| r17 = 226.274 | d17 = 8.27 | n9 = 1.49845 | v9 = 81.6 |
| r18 = −115.326 | d18 = 0.30 | | |
| r19 = 191.880 | d19 = 2.50 | n10 = 1.67766 | v10 = 32.1 |
| r20 = 66.501 | d20 = 13.20 | n11 = 1.59143 | v11 = 61.2 |
| r21 = −150.100 | d21 = 0.20 | | |
| r22 = 134.351 | d22 = 11.82 | n12 = 1.62032 | v12 = 63.4 |
| r23 = −81.888 | d23 = 2.50 | n13 = 1.85501 | v13 = 23.9 |
| r24 = −273.984 | d24 = 0.20 | | |
| r25 = 95.090 | d25 = 6.00 | n14 = 1.49845 | v14 = 81.6 |
| r26 = 270.414 | d26 = Variable | | |
| r27 = (Iris) | d27 = 3.15 | | |

R:

| | | | |
|---|---|---|---|
| r28 = −54.007 | d28 = 1.80 | n15 = 1.79013 | v15 = 44.2 |
| r29 = 27.869 | d29 = 4.48 | n16 = 1.81265 | v16 = 25.4 |
| r30 = 100.309 | d30 = 5.99 | | |
| r31 = −32.600 | d31 = 1.60 | n17 = 1.73234 | v17 = 54.7 |
| r32 = 37.954 | d32 = 9.84 | n18 = 1.59911 | v18 = 39.2 |
| r33 = −26.597 | d33 = 37.81 | | |
| r34 = −167.219 | d34 = 6.03 | n19 = 1.48915 | v19= 70.2 |
| r35 = −31.752 | d35 = 0.20 | | |
| r36 = −49.083 | d36 = 2.20 | n20 = 1.79013 | v20 = 44.2 |
| r37 = 37.460 | d37 = 7.22 | n21 = 1.50349 | v21 = 56.4 |
| r38 = −78.716 | d38 = 1.10 | | |
| r39 = 97.776 | d39 = 8.50 | n22 = 1.55099 | v22= 45.8 |
| r40 = −28.636 | d40 = 2.20 | n23= 1.81265 | v23 = 25.4 |
| r41 = −72.106 | d41 = 0.20 | | |
| r42 = 66.351 | d42 = 6.20 | n24 = 1.51977 | v24 = 52.4 |
| r43 = −72.752 | d43 = 5.00 | | |

P

| | | | |
|---|---|---|---|
| r44 = ∞ | d44 = 50.00 | n25 = 1.51825 | v25 = 64.2 |
| r45 = ∞ | | | |

TABLE 1

| F-Number | 1.75 | 1.75 | 1.75 | 1.75 | 3.0 |
|---|---|---|---|---|---|
| Variable | | | Focal Length | | |
| Separation | 10.00 | 19.49 | 69.78 | 256.60 | 440.00 |
| d8 | 4.19 | 46.19 | 94.19 | 117.69 | 123.20 |
| d15 | 120.00 | 78.00 | 30.00 | 6.50 | 1.00 |
| d16 | 58.01 | 52.96 | 38.83 | 15.15 | 1.06 |
| d26 | 3.30 | 8.36 | 22.49 | 46.17 | 60.26 |
| D | 31.5 | 31.5 | 32.2 | 46.0 | 47.0 |
| Da | 28.0 | 28.2 | 31.5 | 46.0 | 35.6 |
| Dm | 29.2 | 43.3 | 44.2 | 33.7 | 29.4 |

As described above, according to the first embodiment of the invention, a stop of variable aperture diameter is provided in a certain specific position. Thus it has become possible to remove the flare of the maximum image height. For a specific zooming region, the aperture diameter of the stop is made variable. Thus, it becomes easy to produce good optical performance. With the use of the computation circuit and the storage circuit, it becomes also possible to get good responsibility, reduce the number of mechanical parts, and minimize the size.

In the above description, there has been disclosed the embodiment in which the flare component is removed by varying the aperture diameter of the stop. In the following, another embodiment in which the flare component is removed by axially moving a stop is explained.

Figure 15:
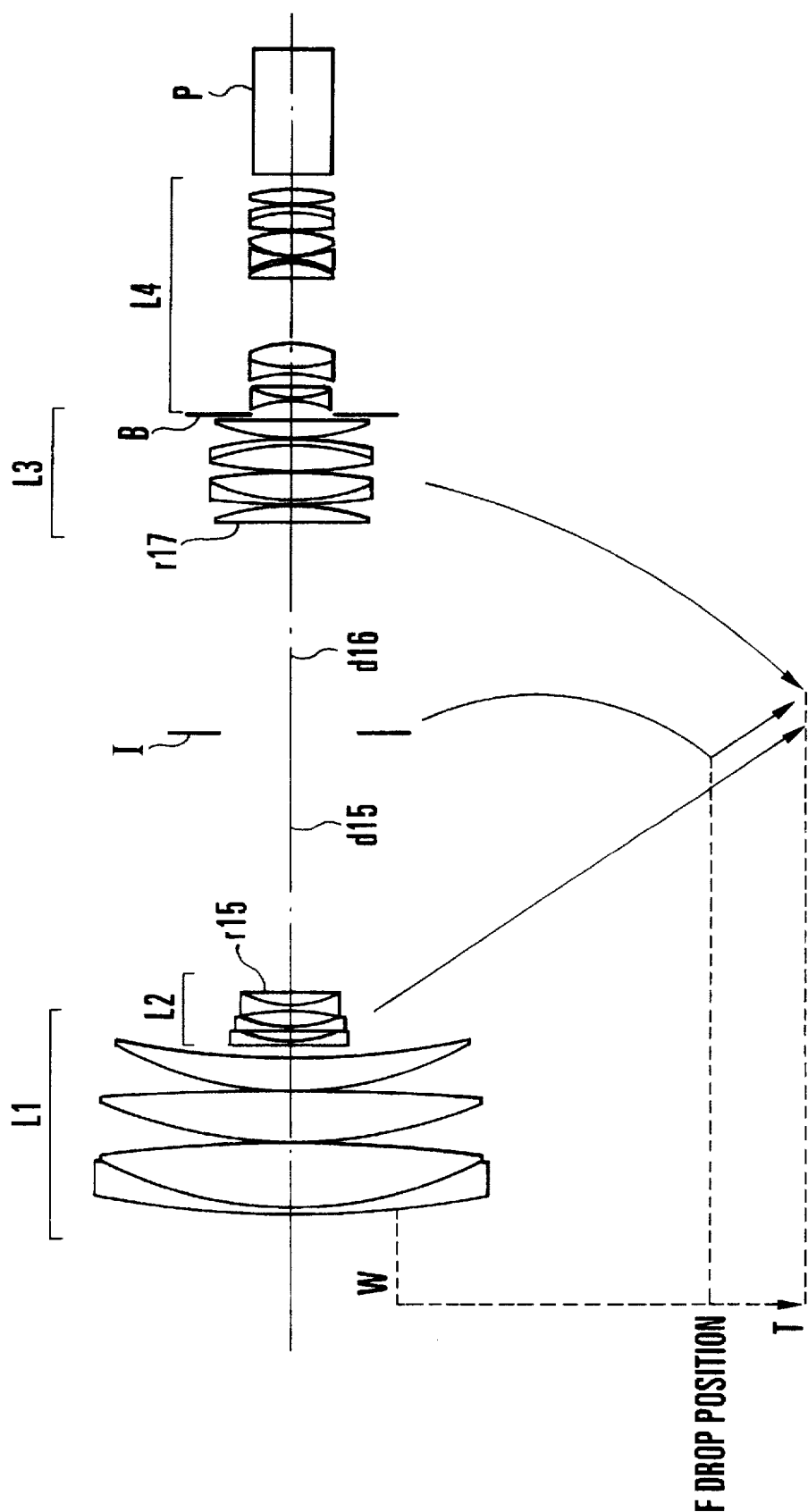
FIG. 15 is a longitudinal section view of a second embodiment of a zoom lens according to the invention.

FIG. 15 is a longitudinal section view of the main parts of a second embodiment of an optical system according to the invention applied to the television camera. FIG. 22 and FIG. 23 are fragmentary lens block diagrams to show the optical features of the invention, with FIG. 22 in the wide-angle end and FIG. 23 in the F drop beginning point (or the zoom position at which the F-number begins to increase as zooming from the wide-angle end to the telephoto end).

In these drawings, L1 denotes the first lens unit of positive power axially movable for focusing and stationary during zooming. L2 is the second lens unit (variator) of negative power axially movable for zooming.

L3 is the third lens unit (compensator) of positive power. To perform the functions of varying the focal length and of compensating for the image shift, it moves axially. L4 is the fourth lens (relay lens) of positive power. P is the 3P prism as the color separation optical system shown as an optical block.

Here, B is an iris of variable aperture diameter that determines the F-number of the zoom lens, and I is a flare cut stop (movable stop) of fixed aperture diameter according to the invention.

The optical aspect of the zoom lens of the invention is first described below. The invention has a feature that the zoom lens is of such a 4-unit type as shown in FIG. 15, wherein of all the regions of the zooming range of from the wide-angle end to the telephoto end, particularly the middle region (from the zoomed position by some short distance from the wide-angle end toward the telephoto end till the beginning point of F drop) is selected to cut only that part of the lower rim rays which increases in aberrations by the flare cut stop.

Specifically speaking, the region to be used is of focal lengths equal to $6\sqrt{Z}$ to $\sqrt{Z}$ times the shortest focal length where Z is the zoom ratio, in which the off-axial bundle of rays is shut only in part out. The full open F-number bundle of rays is not cut throughout the entire range of focal lengths from the wide-angle end to the telephoto end.

For this purpose, the aperture diameter of the flare cut stop I is determined not to cut the F-number bundle at the beginning point of F drop. In the intermediate zooming region, the aberration increases with the lower rim rays. So, the flare cut stop I is made to move to positions where only the lower rim rays that become harmful are shut out effectively.

That is, in the second embodiment, as shown in FIG. 15, the flare cut stop I is moved by using separate operating means as independent of that for the second and third lens units. Incidentally, for the region of from the F drop beginning point to the telephoto end, the flare cut stop I is made to move toward the image side so as to avoid occurrence of mechanical interference with the second lens unit.

Next, the characteristic features of the second embodiment of the invention are described by reference to FIGS. 22 and 23.

In FIG. 23, the on-axial F-number ray 10a passes through the variator L2 and the compensator L3, wherein it lies outside the lower marginal ray 10b of the off-axial bundle at almost all zooming stations in the outer region. Meanwhile, in FIG. 22, conversely the lower rim ray 10b passes outside the on-axial F-number ray 10a.

The invention utilizes this difference and makes determination of the position for the flare cut stop I in such a way that, while, at the F drop beginning point, the on-axial F-number ray 10a is not cut, it is on the wide-angle side in the region described before that the part of the off-axial bundle or the lower rim ray 10b is effectively cut. The area shown by hatching in FIG. 22 is the cut part of the off-axial bundle by the flare cut stop I.

Where the flare cut stop I should be put is, may be as guessed from FIG. 22, determined under the condition that the on-axial F-number ray 10a is not cut and in view of the fact that, as its distance measured forward from the compensator L3 increases, the aperture diameter of the stop I can be made smaller, and the effect of cutting the lower rim rays, too, can be made larger. However, a necessity arises for limiting the possible minimum aperture diameter of the flare cut stop I so that the on-axial F-number ray 10a is not cut.

In addition, at the F drop beginning point, the on-axial F-number bundle (or the ray 10a of FIG. 23) determines the effective diameters of the last lens surface in the variator L2 and of the first lens surface in the compensator L3. So, for the wide-angle side, because the on-axial F-number ray 10a (FIG. 22) passes inside the off-axial ray 10b, a range for the aperture diameter D of the flare cut stop I is given by the following expression:

$$D_V < D < D_C \quad (3)$$

where $D_V$ and $D_C$ are the effective diameters of the last lens surface in the variator L2 and the first lens surface in the compensator L3, respectively.

When the condition (3) is violated, as this results in $D<D_V$, the flare cut stop I shuts out the on-axial F-number ray 10a. Also, as it results in $D>D_C$, the lower rim ray 10b becomes impossible to cut. From this reason, it is recommended to make a determination of the aperture diameter D of the flare cut stop I on the basis of the on-axial F-number ray 10a at the F drop beginning point.

Now assuming that at the F drop beginning point, the last lens surface of the variator L2 and the first lens surface of the compensator L3 are spaced from each other by a distance S and that at the F drop beginning point the flare cut stop I lies at a distance $X_0$ from the last lens surface of the variator L2, the aperture diameter D of the flare cut stop I is defined by:

$$D=(D_V-D_C)/S*X_0+D_C$$

With regard to the position for the flare cut stop I at the F drop beginning point, it is desirable to set forth:

$$0.25*S \geq X_0 \quad (4)$$

If $X_0>0.25*S$, then the difference between the heights of the on-axial F-number ray 10a at the F drop beginning point and the lower rim ray in the intermediate zooming region becomes too small to allow the lower rim ray to be shut out.

So, to effectively shut the lower rim ray out in the intermediate zooming region, a range is set forth for the distance x' of the flare cut stop I from the last lens surface of the variator L2 as follows:

$$0.4*s' \leq x' \quad (5)$$

where s' is the distance between the last lens surface of the variator L2 and the first lens surface of the compensator L3.

In a case where $X_O$ is constant, if this condition is violated, or x'<0.4*s', the height of the lower rim ray from the optical axis becomes low as compared with the aperture diameter. Therefore, the effect for cutting the lower rim ray becomes small.

It will be appreciated from the foregoing that in the second embodiment, to cut only the flare component, proper rules or conditions are set forth for the aperture diameter of the flare cut stop and the movement of the flare cut stop. When these conditions are satisfied, a zoom lens of improved optical performance is obtained.

Next, the second embodiment of the invention is described in connection with numerical examples thereof.

In a numerical example 2 to be described more fully later, as zooming from the wide-angle end to the F drop beginning point, the flare cut stop I axially moves, while depicting a curved locus, so as to keep the relationship between it and the variator in an equation for their distance (x') as x'=0.4*s'.

In another numerical example 3, for a zooming region of from the wide-angle end to a position for $\sqrt{Z}$ times the shortest focal length of the entire system where Z is the zoom ratio, the position for the flare cut stop is made invariable.

At the position for $\sqrt{Z}$ times the shortest focal length, the flare cut stop I is located in such a way as to satisfy the relationship of x'=0.33s'. From the position of $\sqrt{Z}$ times as large to the F drop beginning point, the flare cut stop I moves toward the object side.

In both of the numerical examples 2 and 3, from the F drop beginning point to the telephoto end, the flare cut stop I, while keeping unison with the variator L2 at a distance x'=2.87 mm, moves toward the image side to decrease the distance from the compensator L3.

Incidentally, S=34.87 mm in the numerical examples 2 and 3.

The separation between the last lens surface in the variator L2 and the flare cut stop I is made to be:

For the numerical example 2, $X_O$=0.25*S=8.72 mm.
For the numerical example 3, $X_O$=0.20*S=6.97 mm.

Meanwhile, the last lens surface r15 of the variator L2 and the first lens surface r17 of the compensator L3 have effective diameters of $D_V$=34.36 mm and $D_C$=55.3 mm, respectively. These values are determined by the on-axial F-number ray 10a at the F drop beginning point. The aperture diameter D of the flare cut stop I should not be made smaller than the diameter of the on-axial F-number bundle at the F drop beginning point. Therefore, it has to be determined by where to position the flare cut stop I in between the variator L2 and the compensator L3.

From the equalities and inequalities (3), (4) and (5) described before, for the numerical example 2, D=39.08 mm and
for the numerical example 3, D=38.00 mm.

The flare cut stop to be used has such a value of the aperture diameter. By the form and the construction and arrangement described above, the flare is effectively removed.

Next, a moving mechanism which operates when zooming is performed is described. In the zoom lens of the invention, the flare cut stop I is arranged on zooming to move in differential relation to the variator and the compensator. To this purpose, independent means is provided for moving the flare cut stop I.

Figure 21A:
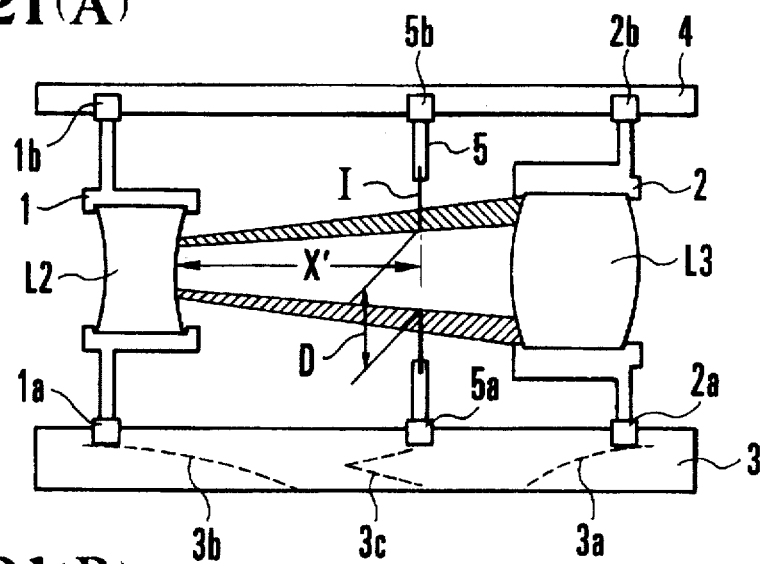
FIGS. 21(A), 21(B) and 21(C) are schematic sectional views of a moving mechanism of the second embodiment of the invention in three operative positions.
Figure 21B:
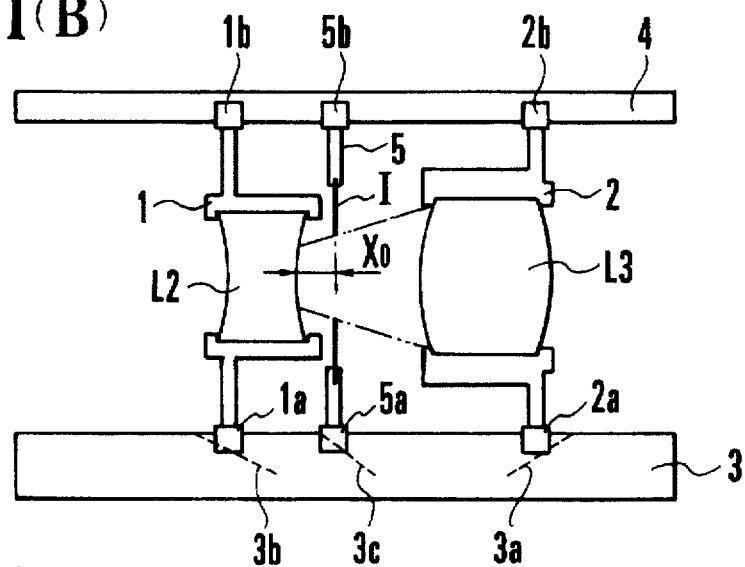
Figure 21C:
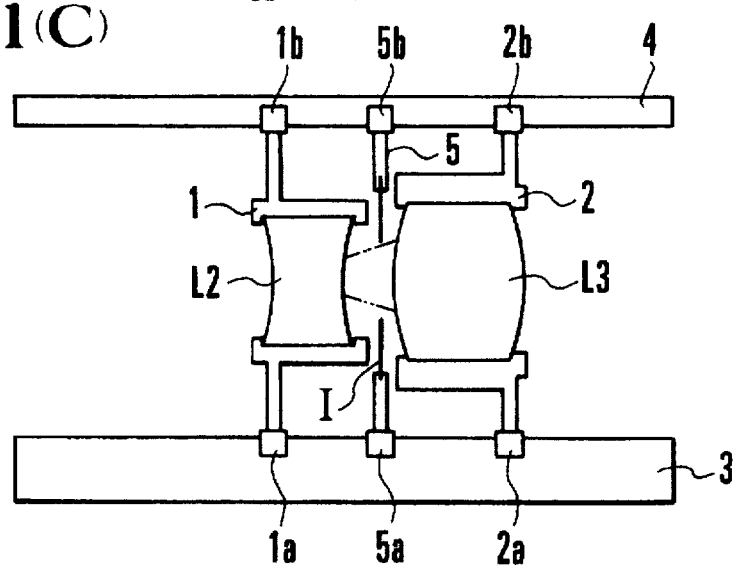
Figure 24:
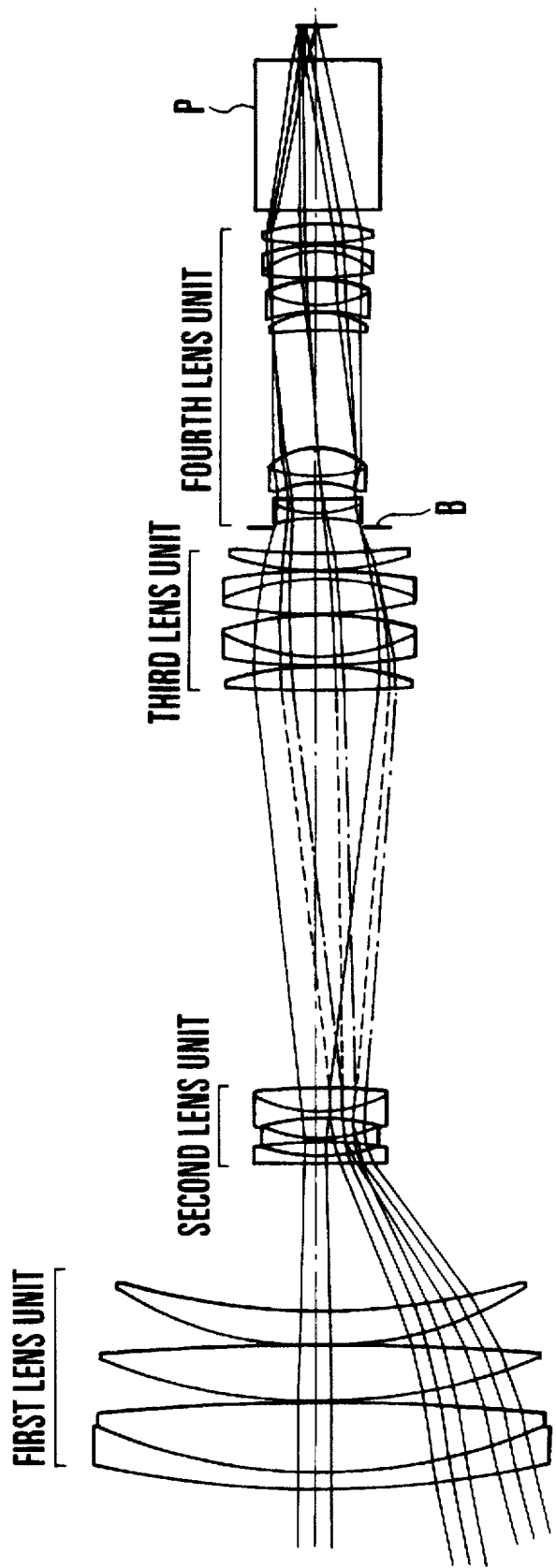
FIG. 24 is a longitudinal section view of the conventional zoom lens.

FIGS. 21(A), 21(B) and 21(C) show a moving mechanism for the flare cut stop I in the zoom lens according to the invention.

Holders 1 and 2 containing the variator L2 and the compensator L3 have cam followers 1a and 2a radially extending into camming slots 3b and 3a respectively formed in a cam cylinder 3 based on the optical relationship. Another cam followers 1b and 2b radially extend into a common linear groove 4 formed in a tubular body (not shown) for the zoom lens. As the cylinder cam 3 rotates, the lens units L2 and L3 axially move along the linear groove 4. The flare cut stop I is held in a ring member 5. To keep the appropriate position in the space between the variator L2 and the compensator L3 at any zooming station, a cam follower 5a extends from the ring member 5 into a camming slot 3c in the cylinder cam 3 and another cam follower 5b extends into the linear groove 4 in the tubular body. As the cylinder cam 3 rotates, the flare cut stop I moves axially along the linear groove 4.

It will be appreciated from the foregoing that in the second embodiment of the invention, the zoom lens is provided with the flare cut stop I of constant aperture diameter arranged in separation from the iris for determining the F-number of the entire system to move in the space between the variator L2 and the compensator L3. In combination, there is provided a moving mechanism which operates in such a manner that the lower rim ray is cut effectively in a region of from a focal length slightly increased from the shortest focal length to a focal length at or near the F drop beginning point, and that the mechanical interference with the variator L2 is avoided in another region of from the F drop beginning point to the telephoto end by moving to narrow the separation between the flare cut stop I and the compensator L3. A zoom lens of simple form and low cost, while still maintaining a great advantage of improving the performance to be produced is thus obtained.

Next, numerical examples 2 and 3 of the invention are shown. In the numerical data for the examples 2 and 3, ri is the radius of curvature of the i-th lens surface, when counted from the object side, di is the i-th axial lens thickness or air separation and ni and vi are respectively the refractive index and Abbe number of the glass of the i-th lens element.

Incidentally, Tables 2 and 3 each show the relationship between the focal length and the variable separations in the numerical examples 2 and 3, respectively. In Table 2, the position for the flare cut stop at the F drop beginning point is determined to be $X_O$=8.72, and in Table 3 to be $X_O$=6.97. The aberrations of the zoom lenses of the numerical examples 2 and 3 are shown in FIGS. 16(A)(1)–16(A)(3) and 16(B)(1)–16(B)(4) (for f=10 mm or the shortest focal length), FIGS. 17(A)(1)–17(A)(3) and 17(B)(1)–17(B)(4) (for f=18.93 or 6$\sqrt{Z}$ times as large), FIGS. 18(A)(1)–18(A) (3) and 18(B)(1)–18(B)(4) (for f=64.82 or $\sqrt{Z}$ times as large), FIGS. 19(A)(1)–19(A)(3) and 19(B)(1)–19(B)(4) (for f=200.23 mm or F drop beginning point) and FIGS. 20(A) (1)–20(A)(3) and 20(B)(1)–20(B)(4) (for f=440 mm or telephoto end).

In the aberration curves, the part on the left hand side of the hatching is cut by the flare cut stop (movable stop). The two hatched areas are labeled by numbers at the top thereof. The digit 1 corresponds to the case of Table 2, and the digit 2 to the case of Table 3. As is apparent from the aberration curves, the coma flare component is effectively cut in the focal length region of from f=18.93 mm to f=64.82 mm. Also, as shown in the numerical example 3, by taking the aperture diameter of the flare cut stop as a small value and under the condition that the on-axial F-number ray is not cut in the intermediate focal length region, the flare cut stop is moved while depicting such a locus as to approach the compensator as far as possible, thereby making it possible to remove the coma flare component more advantageously.

NUMERICAL EXAMPLES 2 AND 3

| f = 10.00–440.0 | | Fno = 1:175 | | 2ω = 57.6° | |
|---|---|---|---|---|---|
| r1 = | 376.21 | d1 = | 5.50 | n1 = | 1.72311 ν1 = 29.5 |
| r2 = | 177.11 | d2 = | 0.70 | | |
| r3 = | 176.93 | d3 = | 23.10 | n2 = | 1.43496 ν2 = 95.1 |
| r4 = | −669.49 | d4 = | 0.30 | | |
| r5 = | 176.40 | d5 = | 18.90 | n3 = | 1.43496 ν3 = 95.1 |
| r6 = | −2349.39 | d6 = | 0.30 | | |
| r7 = | 132.49 | d7 = | 11.53 | n4 = | 1.49845 ν4 = 81.6 |
| r8 = | 249.61 | d8 = | Variable | | |
| r9 = | 654.82 | d9 = | 2.00 | n5 = | 1.82017 ν5 = 46.6 |
| r10 = | 66.97 | d10 = | 3.79 | | |
| r11 = | −2513.70 | d11 = | 1.80 | n6 = | 1.77621 ν6 = 49.6 |
| r12 = | 53.55 | d12 = | 6.67 | | |
| r13 = | −64.98 | d13 = | 1.80 | n7 = | 1.82017 ν7 = 46.6 |
| r14 = | 45.67 | d14 = | 5.49 | n8 = | 1.93306 ν8 = 21.3 |
| r15 = | 353.68 | d15 = | Variable | | |
| r16 = | (Stop) | d16 = | Variable | | |
| r17 = | −1012.25 | d17 = | 6.00 | n9 = | 1.50014 ν9 = 65.0 |
| r18 = | −101.88 | d18 = | 0.30 | | |
| r19 = | 198.87 | d19 = | 2.50 | n10 = | 1.65223 ν10 = 33.8 |
| r20 = | 78.98 | d20 = | 11.36 | n11 = | 1.59143 ν11 = 61.2 |
| r21 = | −139.10 | d21 = | 0.20 | | |
| r22 = | 158.86 | d22 = | 9.85 | n12 = | 1.60548 ν12 = 60.7 |
| r23 = | −94.56 | d23 = | 2.50 | n13 = | 1.85501 ν13 = 23.9 |
| r24 = | −202.34 | d24 = | 0.20 | | |
| r25 = | 88.25 | d25 = | 6.31 | n14 = | 1.48915 ν14 = 70.2 |
| r26 = | 316.08 | d26 = | Variable | | |
| r27 = | (Iris) | d27 = | 4.11 | | |
| r28 = | −55.89 | d28 = | 1.80 | n15 = | 1.79013 ν15 = 44.2 |
| r29 = | 39.88 | d29 = | 4.44 | n16 = | 1.81265 ν16 = 25.4 |
| r30 = | 176.36 | d30 = | 5.84 | | |
| r31 = | −34.79 | d31 = | 1.60 | n17 = | 1.73234 ν17 = 54.7 |
| r32 = | 33.38 | d32 = | 10.57 | n18 = | 1.59911 ν18 = 39.2 |
| r33 = | −29.57 | d33 = | 24.00 | | |
| r34 = | −652.77 | d34 = | 6.26 | n19 = | 1.48915 ν19 = 70.2 |
| r35 = | −33.03 | d35 = | 0.20 | | |
| r36 = | −56.24 | d36 = | 2.20 | n20 = | 1.79013 ν20 = 44.2 |
| r37 = | 36.97 | d37 = | 7.66 | n21 = | 1.81265 ν21 = 56.4 |
| r38 = | −60.83 | d38 = | 1.10 | | |
| r39 = | 203.13 | d39 = | 7.32 | n22 = | 1.55099 ν22 = 45.8 |
| r40 = | −29.08 | d40 = | 2.20 | n23 = | 1.81265 ν23 = 25.4 |
| r41 = | −94.79 | d41 = | 0.20 | | |
| r42 = | 78.68 | d42 = | 6.15 | n24 = | 1.51977 ν24 = 52.4 |
| r43 = | −61.86 | d43 = | 5.00 | | |
| r44 = | ∞ | d44 = | 50.00 | n25 = | 1.51825 ν25 = 64.2 |
| r45 | ∞ | | | | |

TABLE 2

| F-Number Variable | 1.75 | 1.75 | 1.75 | 1.75 | 3.0 |
|---|---|---|---|---|---|
| | | | Focal Length | | |
| Separation | 10.00 | 18.93 | 64.82 | 200.23 | 440.00 |
| d8 | 2.71 | 43.17 | 90.77 | 113.01 | 121.72 |
| d15 | 109.52 | 82.36 | 45.78 | 8.72 | 2.87 |
| d16 | 73.02 | 54.91 | 30.52 | 26.15 | 3.71 |
| d26 | 3.30 | 8.36 | 22.49 | 40.67 | 60.26 |

D = 39.08
$X_0 = 0.25 \times S$

TABLE 3

| F-Number Variable | 1.75 | 1.75 | 1.75 | 1.75 | 3.0 |
|---|---|---|---|---|---|
| | | | Focal Length | | |
| Separation | 10.00 | 18.93 | 64.82 | 200.23 | 440.00 |
| d8 | 2.71 | 43.17 | 90.77 | 113.01 | 121.72 |
| d15 | 138.93 | 98.47 | 50.87 | 6.97 | 2.87 |
| d16 | 43.61 | 38.80 | 25.44 | 27.90 | 3.71 |
| d26 | 3.30 | 8.36 | 22.49 | 40.67 | 60.26 |

D = 38.00
$X_0 = 0.20 \times S$

According to the invention, in the second embodiment thereof, a flare cut stop (movable stop) is provided in the space between the two lens units movable for zooming. During zooming, the flare cut stop is moved axially so as to satisfy predetermined conditions, thereby effectively removing the flare, while avoiding occurrence of mechanical interference. A high optical performance is thus obtained with each over the entire zooming range. It is, therefore, possible to achieve a zoom lens having the flare cut stop while still permitting the entire system to be minimized in bulk and size and constructed in simple form.

What is claimed is:

1. A zoom lens comprising, from front to rear,
    a first lens unit having a positive refractive power;
    a second lens unit having a negative refractive power;
    a flare cut stop for cutting a lower marginal ray of an off-axial bundle of rays for a maximum image height;
    a third lens unit having a positive refractive power; and
    a fourth lens unit having a positive refractive power,
    said second lens unit and said third lens unit being moved to effect zooming.

2. A zoom lens according to claim 1, wherein said first lens unit and said fourth lens unit remain stationary during zooming.

3. A zoom lens according to claim 2, wherein said first lens unit moves for focusing purposes.

4. A zoom lens according to claim 1, wherein the aperture diameter of said stop varies so as to cut said lower marginal ray at least in a region of from $6\sqrt{Z}$ to $\sqrt{Z}$, where Z is a zoom ratio of said zoom lens.

5. A zoom lens according to claim 1, wherein said second lens unit and said third lens unit vary image magnifications thereof past −1 times at the same time during zooming from a wide-angle end to a telephoto end.

6. A zoom lens according to claim 1, further comprising an iris for determining an F-number in rear of said third lens unit.

7. A zoom lens according to claim 1, further comprising control means for controlling the aperture diameter of said flare cut stop on the basis of an output signal of zoom position detecting means.

8. A zoom lens according to claim 1, further comprising zoom position detecting means, storage means for storing information for the aperture diameter of said flare cut stop in correspondence to each zoom position, and control means for controlling the aperture diameter of said flare cut stop in accordance with information from said zoom position detecting means and said storage means.

9. A zoom lens according to claim 1, wherein said stop is movable.

10. A zoom lens according to claim 9, wherein the aperture diameter of said stop is constant.

11. A zoom lens according to claim 10, satisfying the following conditions:

$$D_V < D < D_C$$
$$X_0 \leq 0.25 * S$$

where D is the aperture diameter of said movable stop, $D_V$ is the effective diameter of the last lens surface in said second lens unit, $D_C$ is the effective diameter of the front or first lens surface in said third lens unit, S is the distance between the last lens surface in said second lens unit and the front or first lens surface in said third lens unit at an F drop beginning point of said zoom lens, and $X_0$ is the distance between said movable stop and the last lens surface in said second lens unit at the F drop beginning point;

and further satisfying the following condition:

$$0.4 * s' \leq x'$$

where s' is the distance between the last lens surface in said second lens unit and the front or first lens surface in said third lens unit at any focal length in a focal length region of from $6\sqrt{Z}$ to $\sqrt{Z}$ times the shortest focal length, wherein Z is a zoom ratio of said zoom lens, and where x' is the distance between the last lens surface in said second lens unit and said movable stop.

* * * * *

UNITED STATES PATENT AND TRADEMARK OFFICE
CERTIFICATE OF CORRECTION

PATENT NO. : 5,790,316

DATED : August 4, 1998

INVENTOR(S) : Chiaki TERASAWA, et al.

It is certified that error appears in the above-identified patent and that said Letters Patent is hereby corrected as shown below:

<u>COLUMN 12</u>:

Line 15, "may be as" should read --as may be--.

Signed and Sealed this

Fourth Day of May, 1999

*Attest:*

Q. TODD DICKINSON

*Attesting Officer*    Acting Commissioner of Patents and Trademarks